United States Patent
Ravishankar et al.

(10) Patent No.: US 10,944,471 B2
(45) Date of Patent: Mar. 9, 2021

(54) SYSTEM AND METHOD FOR PROVIDING HIGH THROUGHPUT DATA SERVICES USING MEO AND LEO SATELLITE SYSTEMS

(71) Applicant: Hughes Network Systems, LLC, Germantown, MD (US)

(72) Inventors: Channasandra Ravishankar, Clarksburg, MD (US); John Corrigan, Chevy Chase, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/354,617

(22) Filed: Mar. 15, 2019

(65) Prior Publication Data
US 2020/0036435 A1    Jan. 30, 2020

Related U.S. Application Data

(63) Continuation-in-part of application No. 16/186,907, filed on Nov. 12, 2018, which is a continuation-in-part of application No. 15/186,417, filed on Jun. 17, 2016, now Pat. No. 10,177,837.

(60) Provisional application No. 62/643,274, filed on Mar. 15, 2018, provisional application No. 62/181,062, filed on Jun. 17, 2015.

(51) Int. Cl.
H04B 7/185    (2006.01)

(52) U.S. Cl.
CPC ..... *H04B 7/18515* (2013.01); *H04B 7/18519* (2013.01); *H04B 7/18521* (2013.01); *H04B 7/18571* (2013.01)

(58) Field of Classification Search
CPC ............ H04B 7/18515; H04B 7/18517; H04B 7/18519; H04B 7/18521; H04B 7/18571
USPC ....................................................... 370/316
See application file for complete search history.

(56) References Cited

U.S. PATENT DOCUMENTS

| | | | |
|---|---|---|---|
| 6,272,325 B1 | 8/2001 | Wiedeman et al. | |
| 6,442,147 B1 | 8/2002 | Mauger et al. | |
| 6,542,739 B1 | 4/2003 | Garner | |

(Continued)

OTHER PUBLICATIONS

USPTO, "International Search Report & Written Opinion", PCT/US2016/038260, dated Sep. 28, 2016.

*Primary Examiner* — Faisal Choudhury
(74) *Attorney, Agent, or Firm* — Potomac Technology Law, LLC

(57) ABSTRACT

A satellite communications system includes both LEO and MEO satellites, a gateway node (GN) which includes a MEO-GN modem and a LEO-GN modem, and a user terminal (UT) which includes a MEO-UT modem and a LEO-UT modem. The MEO-GN modem transmits data communications to the UT via the MEO satellites. The MEO-UT modem receives the data communications from the MEO-GN modem. The MEO UT modem forwards control messages regarding the data communications received from the MEO-GN modem, via a control message tunnel, to the MEO-GN modem. Via the control message tunnel, (i) the MEO-UT modem provides the control messages to the UT-LEO modem, (ii) the LEO-UT modem transmits the control messages to the LEO-GN modem via the LEO satellites, and (iii) the LEO-GN modem provides the control messages to the MEO-GN modem.

2 Claims, 21 Drawing Sheets

(56) References Cited

U.S. PATENT DOCUMENTS

| | | | |
|---|---|---|---|
| 2002/0137509 A1* | 9/2002 | Laufer | H04B 7/19 |
| | | | 455/427 |
| 2004/0024791 A1 | 2/2004 | Martin et al. | |
| 2007/0252765 A1 | 11/2007 | Jayasuriya et al. | |
| 2008/0181108 A1* | 7/2008 | Hashmi | H04L 47/193 |
| | | | 370/231 |
| 2010/0079333 A1* | 4/2010 | Janky | G01S 19/43 |
| | | | 342/357.24 |
| 2010/0323705 A1 | 12/2010 | Iwamura et al. | |
| 2011/0169688 A1* | 7/2011 | Wyler | H04B 7/2041 |
| | | | 342/354 |
| 2013/0217422 A1 | 8/2013 | Zakaria et al. | |
| 2013/0232565 A1 | 9/2013 | O'Connor et al. | |
| 2013/0321206 A1 | 12/2013 | Chang | |
| 2014/0022983 A1 | 1/2014 | Ravishankar et al. | |
| 2014/0198709 A1 | 7/2014 | Chang | |
| 2015/0024677 A1 | 1/2015 | Gopal et al. | |
| 2015/0052360 A1 | 2/2015 | Ravishankar et al. | |
| 2015/0280810 A1* | 10/2015 | Beals | H04B 7/18504 |
| | | | 455/13.1 |
| 2016/0006500 A1 | 1/2016 | Radpour | |
| 2016/0277096 A1 | 9/2016 | Wu et al. | |
| 2018/0376393 A1* | 12/2018 | Wu | H04W 36/18 |

* cited by examiner

Detailed Network Architecture similar to L1 with accommodations for rain diversity

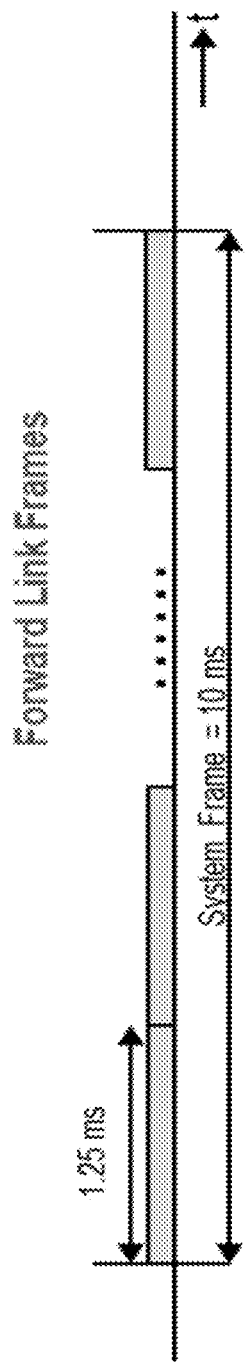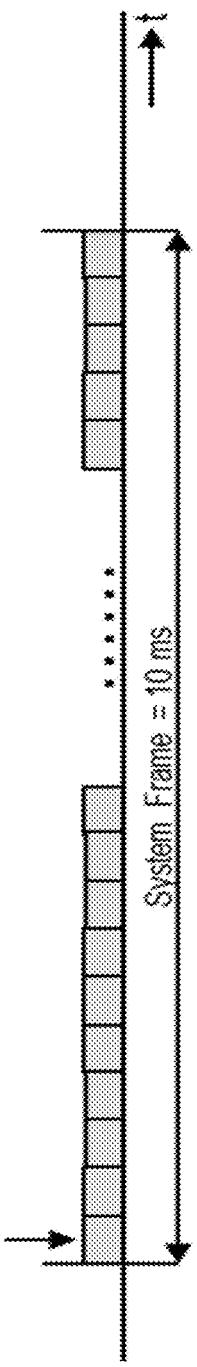

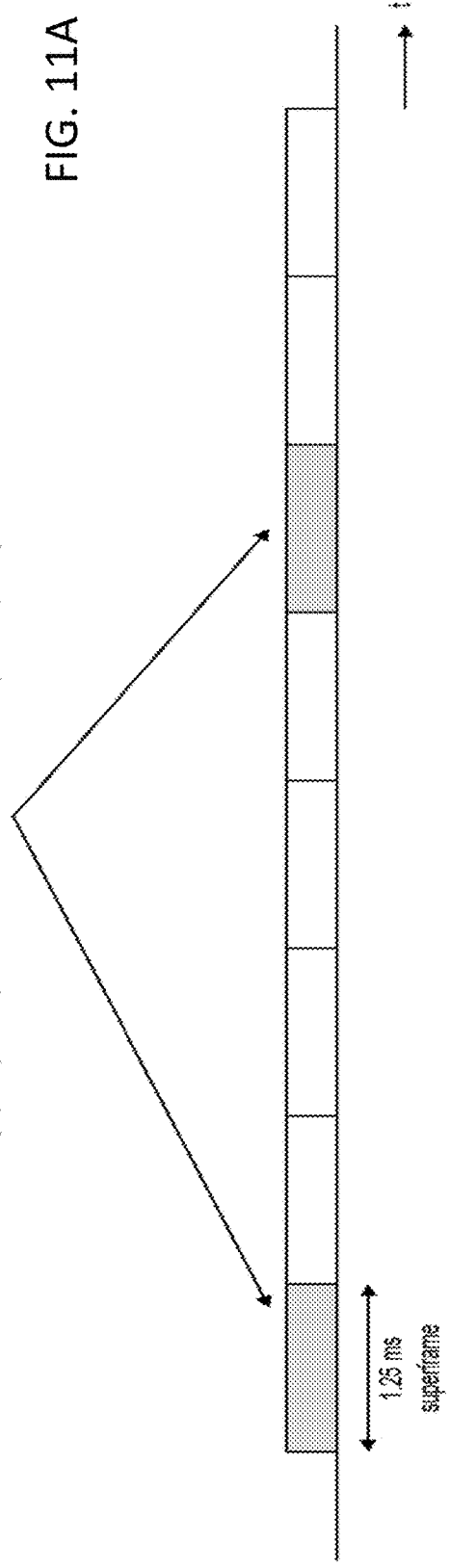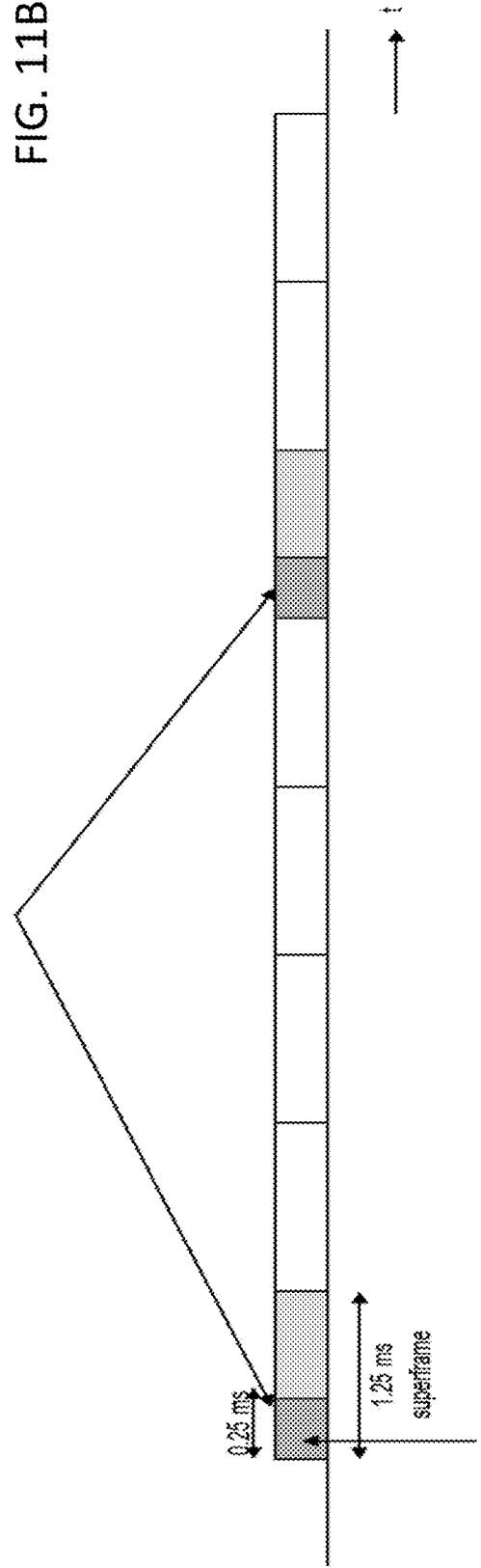

SYSTEM AND METHOD FOR PROVIDING HIGH THROUGHPUT DATA SERVICES USING MEO AND LEO SATELLITE SYSTEMS

RELATED APPLICATIONS

This application claims the benefit of the earlier filing date under 35 U.S.C. § 119(e) from U.S. Provisional Application Ser. No. 62/643,274 (filed 2018 Mar. 15), and is a Continuation-In-Part (CIP) and claims the benefit of the earlier filing date under 35 U.S.C. § 120 from U.S. patent application Ser. No. 16/186,907 (filed 2018 Nov. 12), which is a Continuation-In-Part (CIP) and claims the benefit of the earlier filing date under 35 U.S.C. § 120 from U.S. patent application Ser. No. 15/186,417 (filed 2016 Jun. 17), now U.S. Pat. No. 10,177,837 (issued 2019 Jan. 8), which claims the benefit of the earlier filing date under 35 U.S.C. § 119(e) from U.S. Provisional Application Ser. No. 62/181,062 (filed 2015 Jun. 17), the entireties of all of which are incorporated by reference herein.

BACKGROUND

Terrestrial communication systems continue to provide higher and higher speed multimedia (e.g., voice, data, video, images, etc.) services to end-users. Such services (e.g., Third Generation (3G) and Fourth Generation Long Term Evolution (4G LTE) systems and services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems are being designed to complement and/or coexist with terrestrial coverage depending on spectrum sharing rules and operator choice. With the advances in processing power of portable computers, mobile phones and other highly portable devices, the average user has grown accustomed to sophisticated applications (e.g., streaming video, radio broadcasts, video games, etc.), which place tremendous strain on network resources. Further, such users have grown to expect ubiquitous global coverage. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network). Such high mobility, enhanced processing power of devices, and growth of low-latency applications, however, puts an immense strain on current terrestrial and satellite communications systems.

What is needed, therefore, is an approach for a low-earth-orbit-(LEO)/medium-earth-orbit-(MEO) multi-satellite communications system for efficiently providing high speed and high quality packet data services.

SOME EXAMPLE EMBODIMENTS

Embodiments of the present invention advantageously address the foregoing requirements and needs, as well as others, by providing an approach for providing high speed and high quality packet data services via one or more low earth orbit (LEO) satellite constellations, one or more medium earth orbit (MEO) satellite constellations, or a combination of LEO and MEO satellite constellations. As used herein, the nomenclature "M1" identifies a system as a MEO system and identifies respective system components as MEO-system-specific components, and the nomenclature "L1" identifies a system as a LEO system and identifies respective system components as LEO-system-specific components. The LEO/MEO satellites may be processing satellites. When LEO/MEO satellites are processing satellites, IP packets and Layer 2 frames transmitted by user terminals are recovered at the satellite and transmitted on the gateway links and/or inter-satellite links. Similarly, in the direction from network to user terminal, IP packets and Layer 2 frames transmitted by gateways are recovered at the satellite and transmitted on the user links. The frequency and format of transmission on gateway and user links may be different. In addition, the transmission to and from user terminal on a user link may be different. Similarly, the transmission to and from gateway on a gateway link may be different. The satellites support forward links from a gateway to a user terminal and return links from a user terminal to a gateway, via either a LEO or a MEO satellite, and may support a forward link via a MEO satellite and a respective return link via a LEO satellite. The architecture also permits transmission from user terminal to another user terminal directly without traversing through a gateway. Similarly, the architecture also permits direct gateway to gateway communication via the satellite constellation. Further, such LEO/MEO satellites may provide for inter-satellite links between two LEO satellites, between two MEO satellites, and/or between a LEO satellite and a MEO satellite. When LEO/MEO satellites are not processing satellites (i.e., they are bent-pipe satellites), communication is directly between user terminal and gateway with a frequency translation between gateway links and user links. The satellites of a MEO constellation provide Earth-fixed beams, whereby, unless a user terminal moves, only satellite-satellite handovers would be required to service the terminal.

In accordance with example embodiments of the present invention, a satellite communications system is provided. The satellite system comprises one or more low earth orbit (LEO) satellites, one or more medium earth orbit (MEO) satellites, a gateway node (GN) including a MEO GN modem and a LEO GN modem, and a user terminal (UT) including a MEO UT modem and a LEO UT modem. The MEO GN modem is configured to transmit data communications to the UT via one or more of the MEO satellites. The MEO UT modem is configured to receive the data communications from the MEO GN modem. The MEO UT modem is configured to forward one or more control messages regarding the data communications received from the MEO GN modem, via a control message tunnel, to the MEO GN modem. Via the control message tunnel, (i) the MEO UT modem is configured to provide the one or more control messages to the UT LEO modem, (ii) the LEO UT modem is configured to transmit the one or more control messages to the LEO GN modem via one or more of the LEO satellites, and (iii) the LEO GN modem is configured to provide the one or more control messages to the MEO GN modem.

In accordance with example embodiments of the present invention, a method for data communications via one or more low earth orbit (LEO) satellites and one or more medium earth orbit (MEO) satellites, is provided. Data communications are transmitted, by a first modem of a gateway node (GN), to a user terminal (UT) via one or more of the MEO satellites. The data communications are received, by a first modem of the UT. One or more control messages regarding the data communications received from the first modem of the GN are forwarded, by the first modem of the UT, via a control message tunnel, to the first modem of the GN. Via the control message tunnel, (i) the one or more control messages are provided, by the first modem of the UT, to a second modem of the UT, (ii) the one or more control messages are transmitted, by the second modem of the UT, to a second modem of the GN via one or more of the LEO satellites, and (iii) the one or more control messages are provided, by the second modem of the GN, to the first modem of the GN.

According to example embodiments, the network configuration a MEO constellation may be designed independent of any LEO constellations. By way of example, A user terminal may include two subscriber identity module (SIM) cards—one for communications via the LEO satellites and one for communications via the MEO satellites. As such, increased flexibility is facilitated, the LEO and MEO communications protocols can evolve independently and a MEO-only user terminal configuration can be supported. Further, the MEO core network may be a 3G, 4G or 5G core network.

Further network architecture/system features are as follows:

Powerful FEC coding, near theoretical channel performance;

Adaptive Coding & Modulation (ACM) improves throughput every channel condition;

Power-conserving design reduces power to enable battery/solar powered user terminal (sleep/wake paging cycle);

MAC layer design for efficient Bandwidth-on-Demand;

Support for Small and Large terminal types as well as fixed and mobile terminal types including Aeronautical and Maritime terminals;

Quality-of-Service (QoS) support for multiple service types;

Simplified satellite design to minimize technical and costs risks;

Simplified routing/switching function in the satellite using a centralized route determination function in each gateway that determines optimal routes. This removes the burden for satellite to be dynamically figuring out the routes;

Mobility Management functions enable beam, satellite, gateway and frequency handovers;

Scalable Gateway architecture to cater to different throughputs and different number of LEO/MEO satellites that it would need to communicate with;

Standard wireless and network protocols to utilize commercial implementations and evolution.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which:

FIG. 9D shows an example for forward link system framing based on a system_frame of 10 ms, according to example embodiments;

FIG. 9E shows an example for return link system framing based on a system_frame of 10 ms, according to example embodiments;

FIGS. 11A and 11B illustrate different user terminal (UT) batter efficient scheduling scenarios, according to example embodiments.

DETAILED DESCRIPTION

Figure 1A:
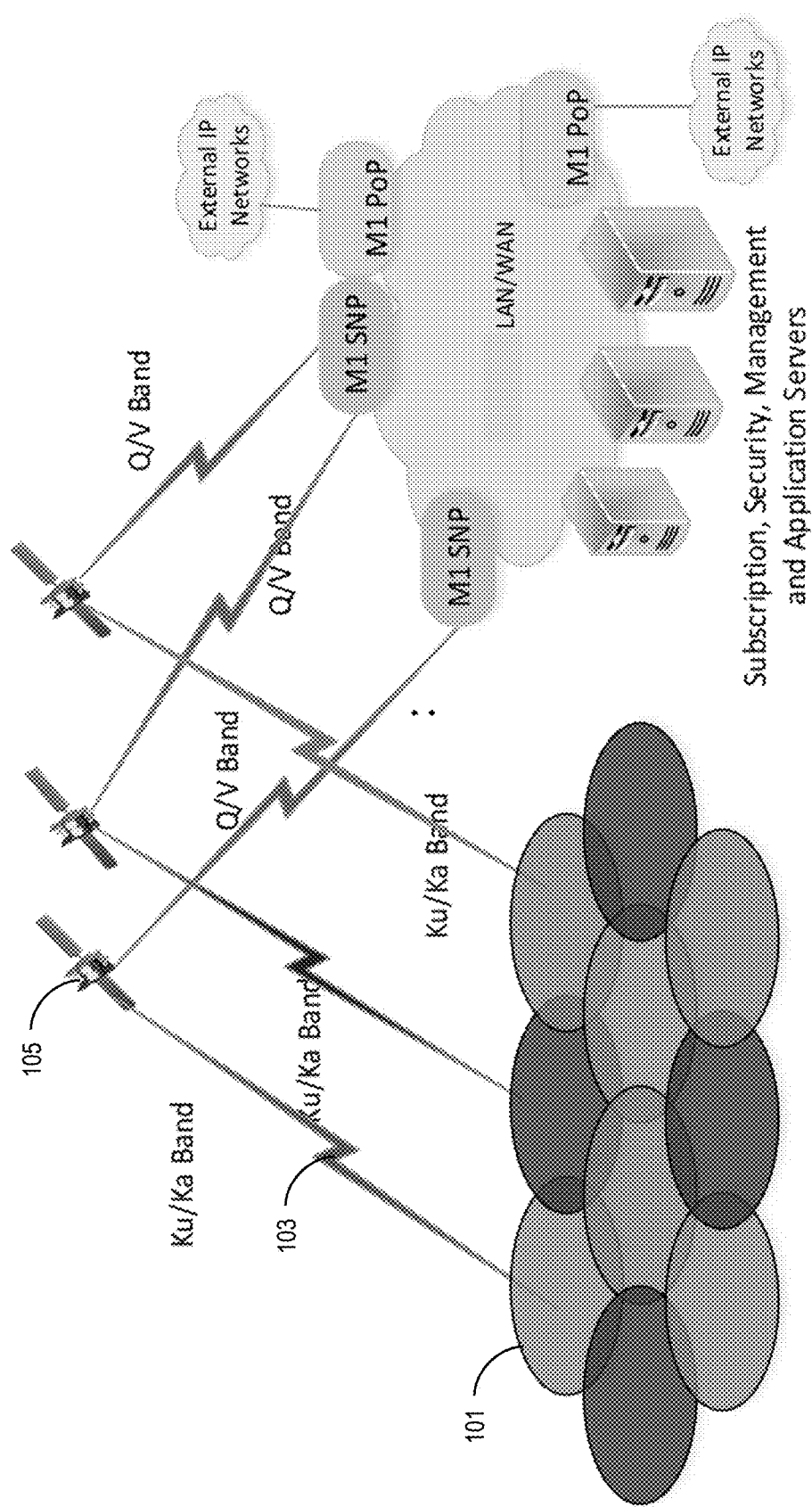
FIG. 1A depicts a network architecture for a medium earth orbit (MEO) system, according to example embodiments.

System architectures and associated processes for providing high speed and high quality packet data services via a LEO/MEO satellite system are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Architecture

Figure 1B:
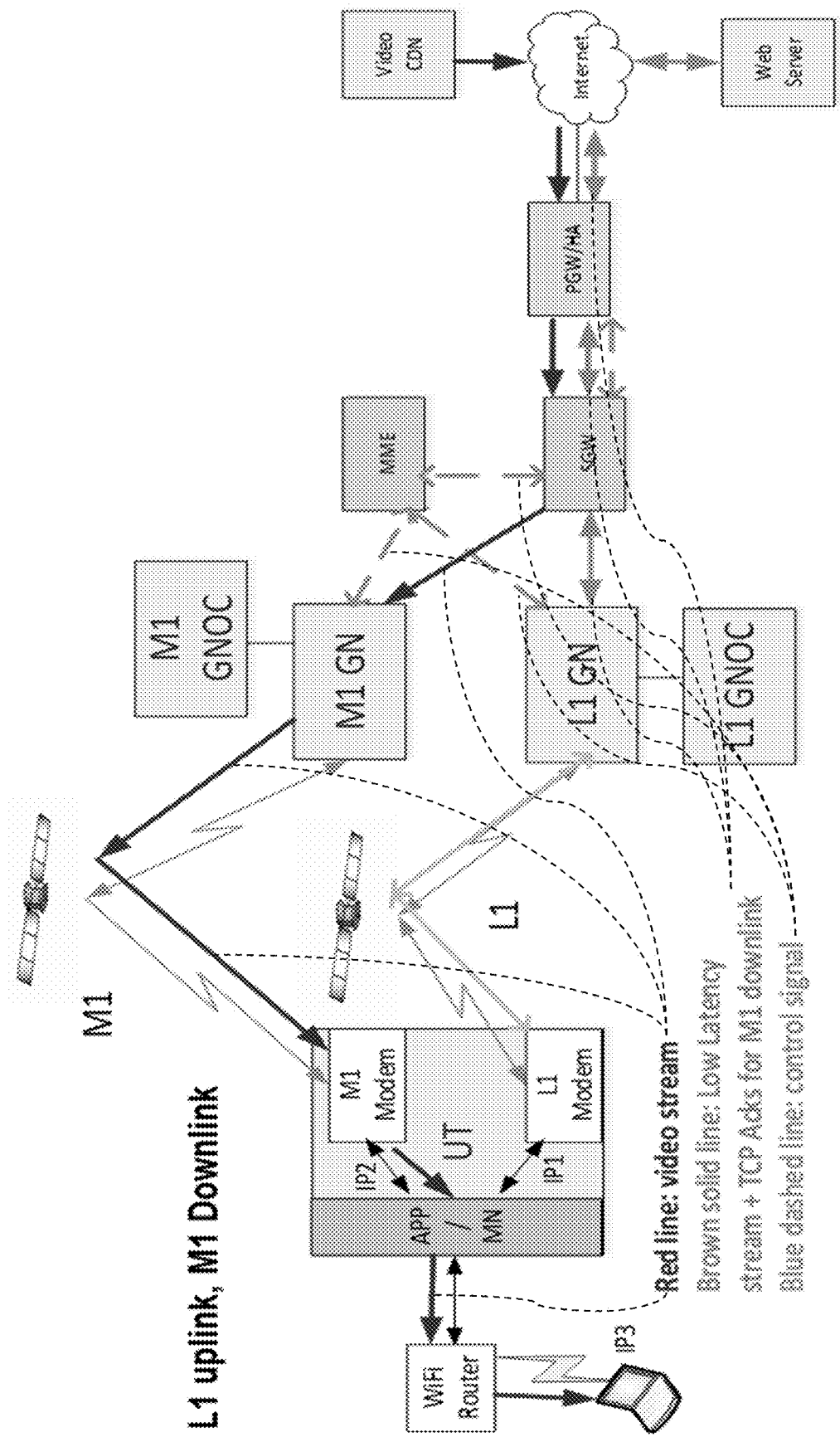
FIG. 1B depicts a network configuration for a medium earth orbit (MEO) system, according to example embodiments.

FIG. 1A depicts a network architecture for a medium earth orbit (MEO) system, and FIG. 1B depicts a network configuration for a medium earth orbit (MEO) system, according to example embodiments. The user terminal (UT) may be in one of a multiplicity of cells 101 serviced by the user-link beams 103 (e.g., Ku/Ka band beams). The satellites 105, and therefore beams corresponding those satellites move (for satellite-fixed beams) over the user terminal as the satellites of a LEO/MEO constellation move even if the user terminal is not moving. Accordingly, beam-to-beam and satellite-to-satellite handovers are required. User terminals are typically equipped with a tracking antenna that is preferably electronically steered. However, the design does not preclude terminals using mechanical steering. In another embodiment, the satellite attempts to steer its antenna such that beams remain in the same place on the earth surface (also called earth-fixed beams). In this case, there is no need for beam-to-beam handover. The system also supports gateway to gateway handover to cater to cases where a user terminal may be in motion and it crosses from one gateway region to another. Gateway to Gateway handover would also be necessary when a Gateway fails or when the capacity of the gateway is such that it cannot accept any additional sessions. As part of the above mentioned beam-to-beam, satellite-to-satellite and gateway-to-gateway handovers, frequency handovers occur in a multiple frequency reuse system. To this end, the system design also supports frequency handover even when there is no beam-to-beam, satellite-to-satellite and gateway-to-gateway handovers; this will be the case when a frequency is deemed unusable due to interference and/or when it is required to move a terminal to a different frequency for resource usage efficiency issues and for services such as IP multicast.

As illustrated, the Ku/Ka bands in user-link and WV bands in the Gateway links serve only as examples. Other frequencies that are mutually exclusive may also be used in gateway links and user links. IP Core network, for example, may be implemented equivalent to a classical 4G-LTE network. Other elements that have a correspondence to 4G LTE core network include Subscription server (equivalent to the Home Subscription Server-HSS), Management Server (equivalent of MME) and Security Server (equivalent to AuC).

Figure 2A:
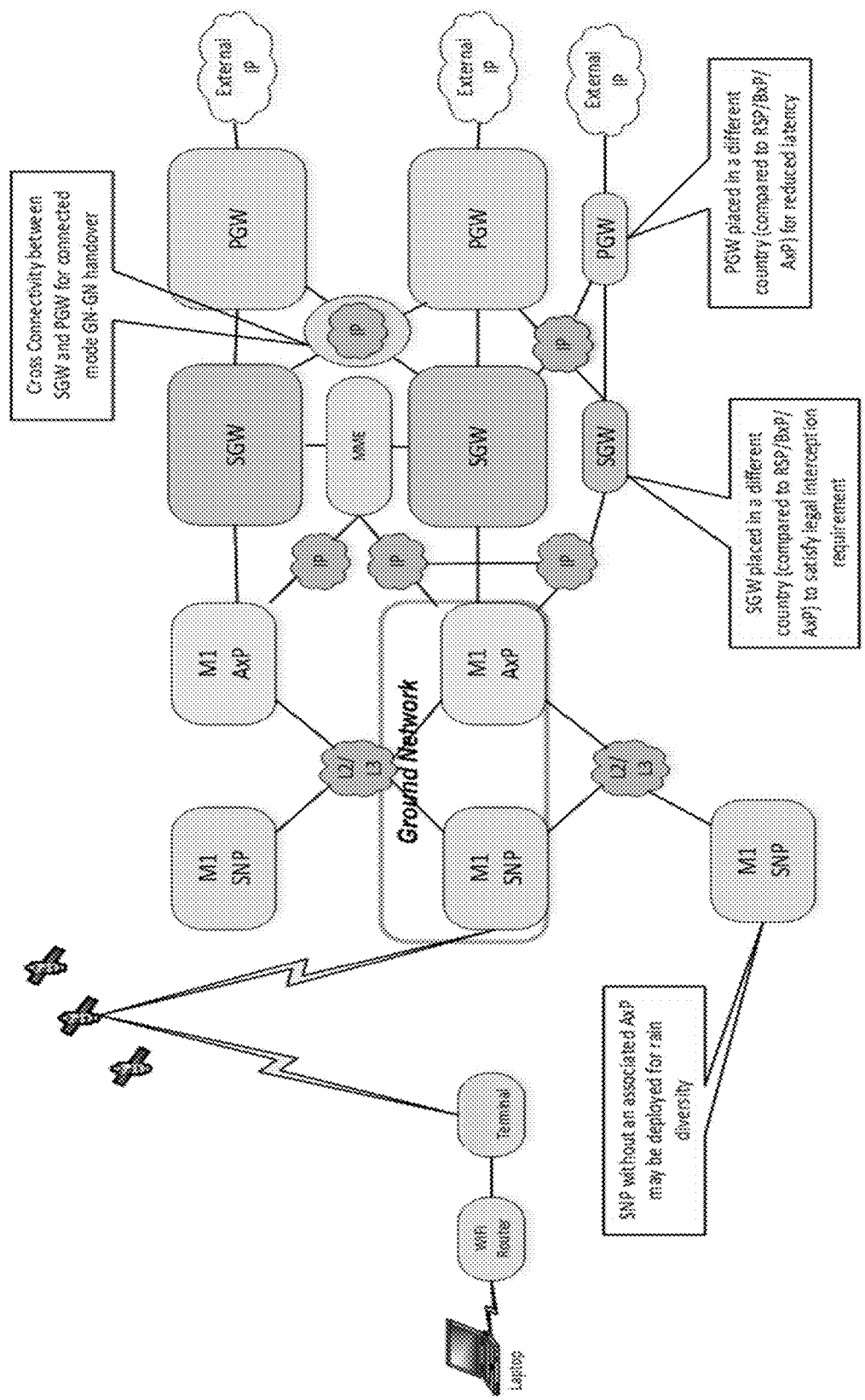
FIG. 2A depicts a network architecture for a medium earth orbit (MEO) system, based on a 4G long-term evolution (LTE) implementation, according to example embodiments.
Figure 2B:
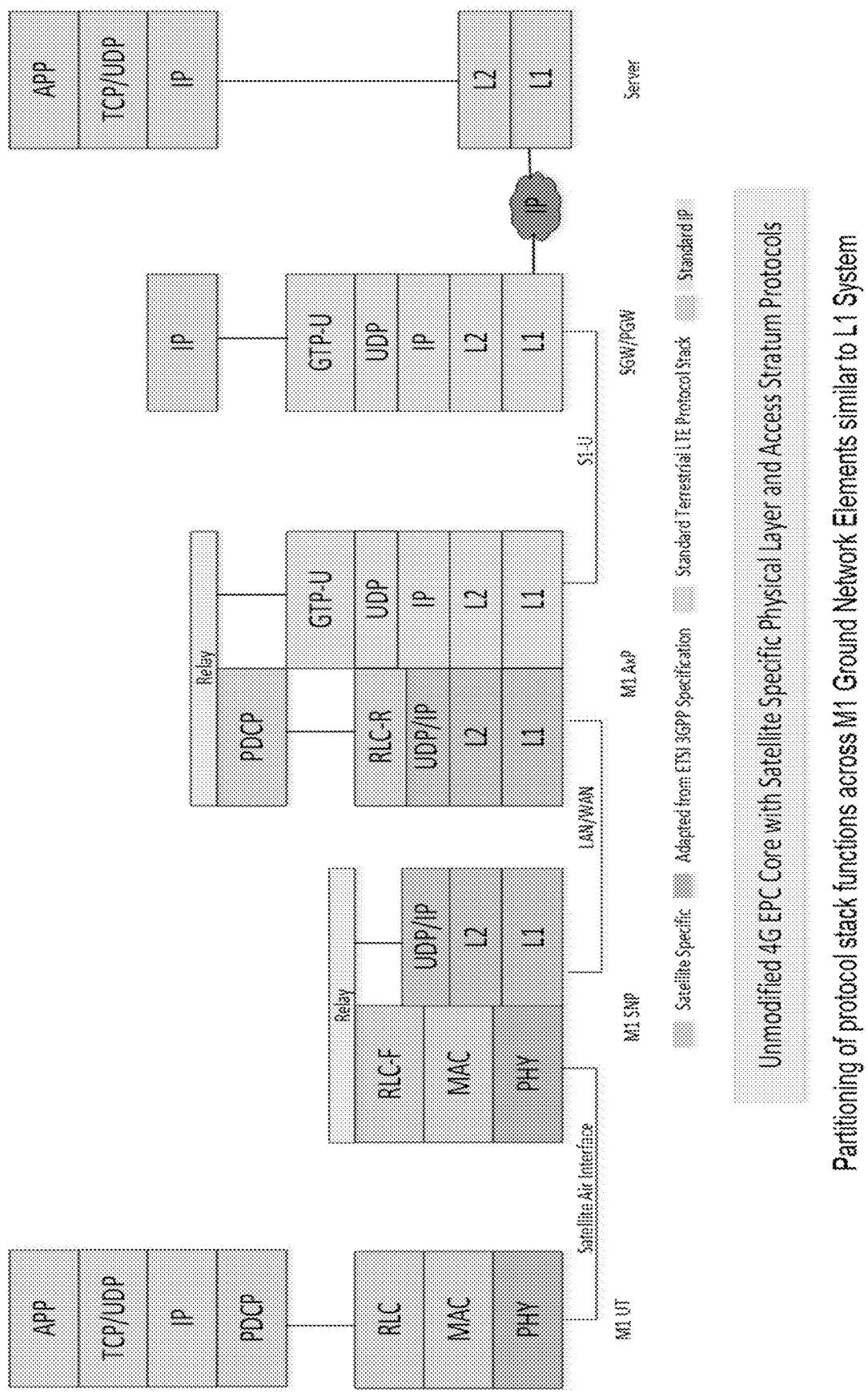
FIG. 2B depicts a user plane protocol architecture for a medium earth orbit (MEO) system, based on a 4G long-term evolution (LTE) implementation, according to example embodiments.
Figure 2C:
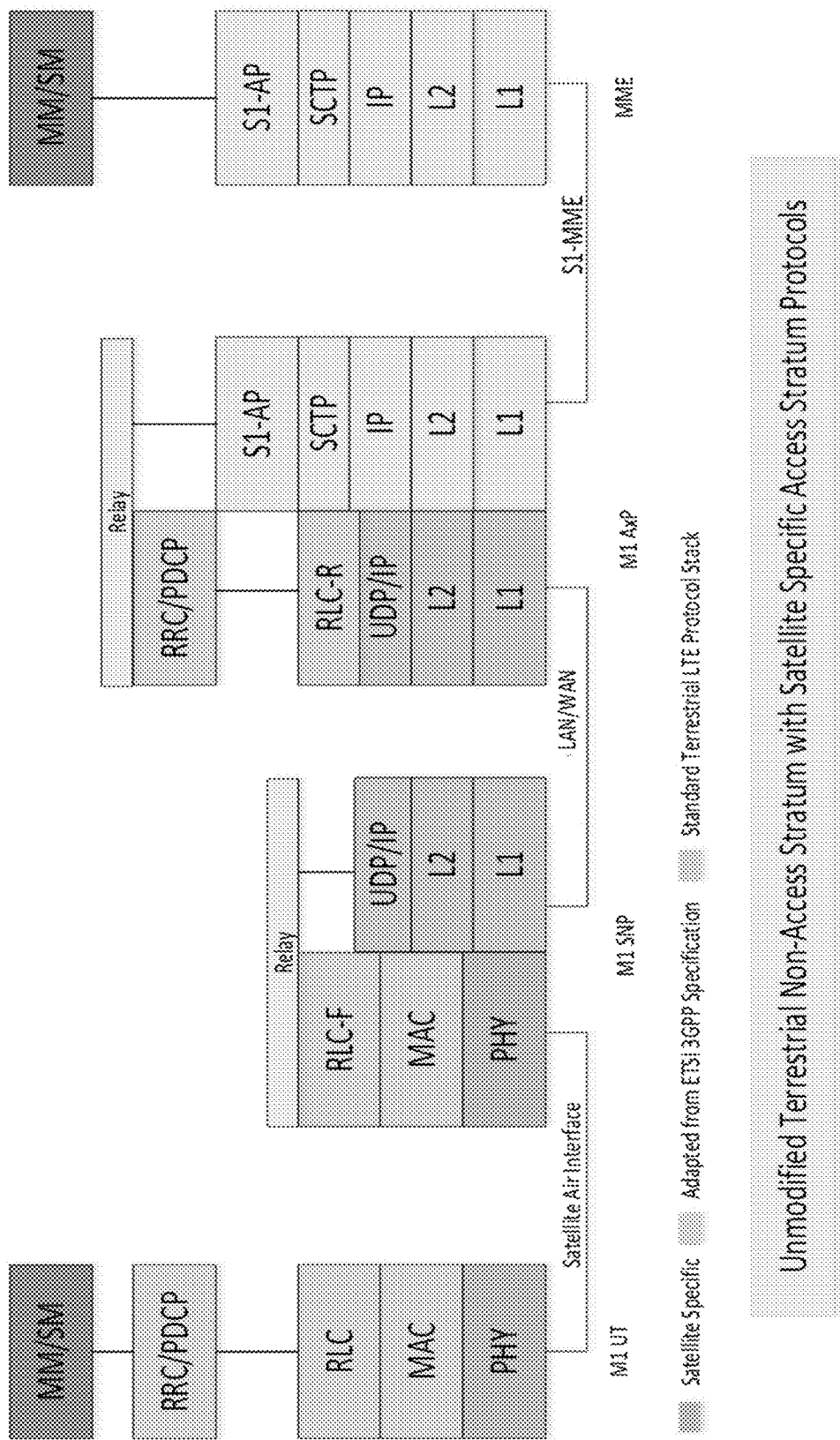
FIG. 2C depicts a user plane protocol architecture for a medium earth orbit (MEO) system, based on a 4G long-term evolution (LTE) implementation, according to example embodiments.

FIG. 2A depicts a network architecture for a medium earth orbit (MEO) system, based on a 4G long-term evolution (LTE) implementation, according to example embodiments. Further, FIG. 2B depicts a user plane protocol architecture for a MEO system, based on a 4G long-term evolution (LTE) implementation, and FIG. 2C depicts the user plane protocol architecture for a MEO system, based on a 4G long-term evolution (LTE) standard implementation, according to example embodiments. The protocol architectures are similar to those of the standard 4G LTE protocol architectures, which enable use of standard 4G core network equipment. With regard to the satellite-specific aspects (e.g., the PHY, MAC/RLC and RRC layers), such protocol aspects may be optimized for the satellite environment (e.g., for MEO only constellations or for a combination of LEO and MEO constellations).

Figure 3A:
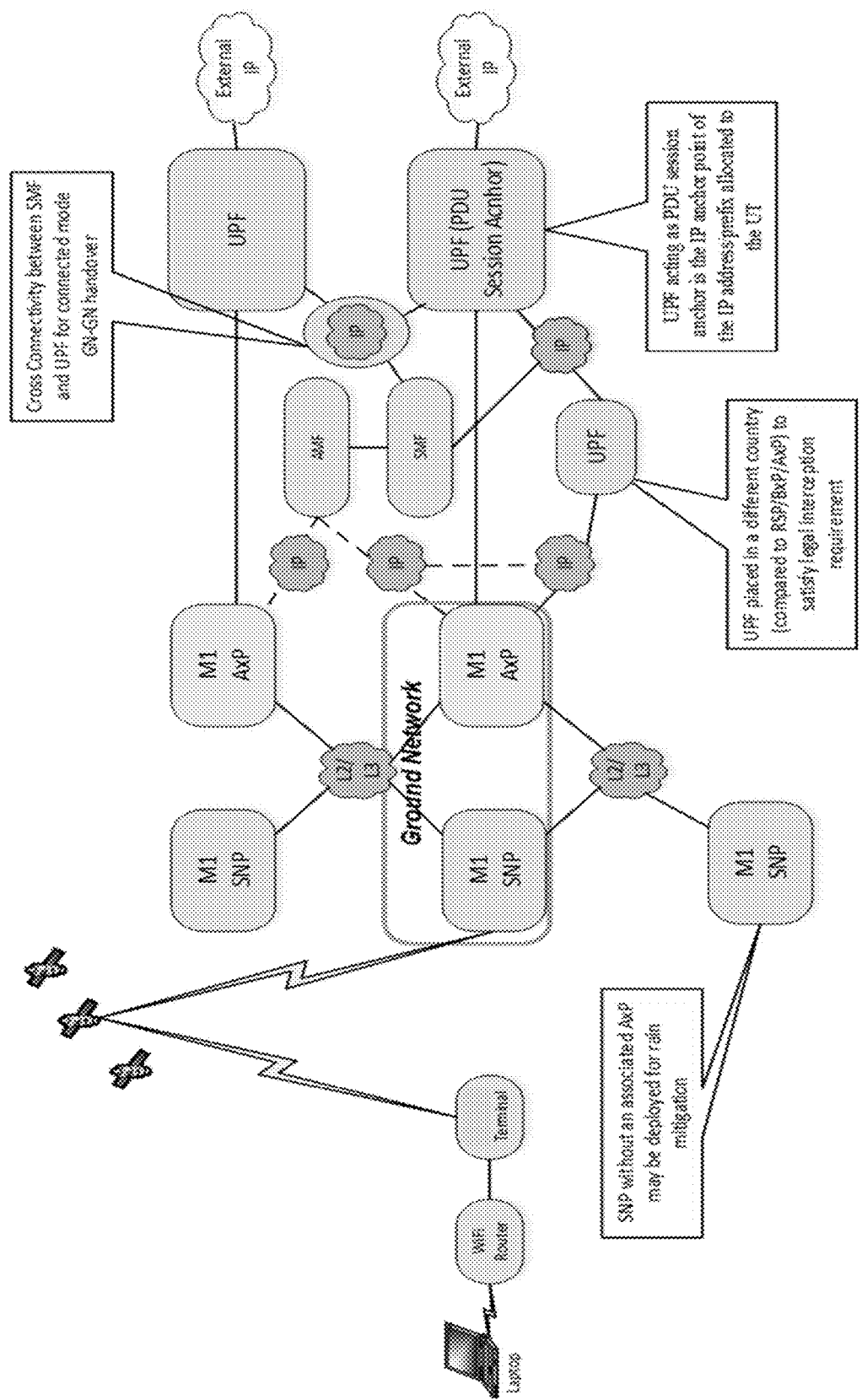
FIG. 3A depicts a network architecture for a medium earth orbit (MEO) system, based on a 5G implementation, according to example embodiments.
Figure 3B:
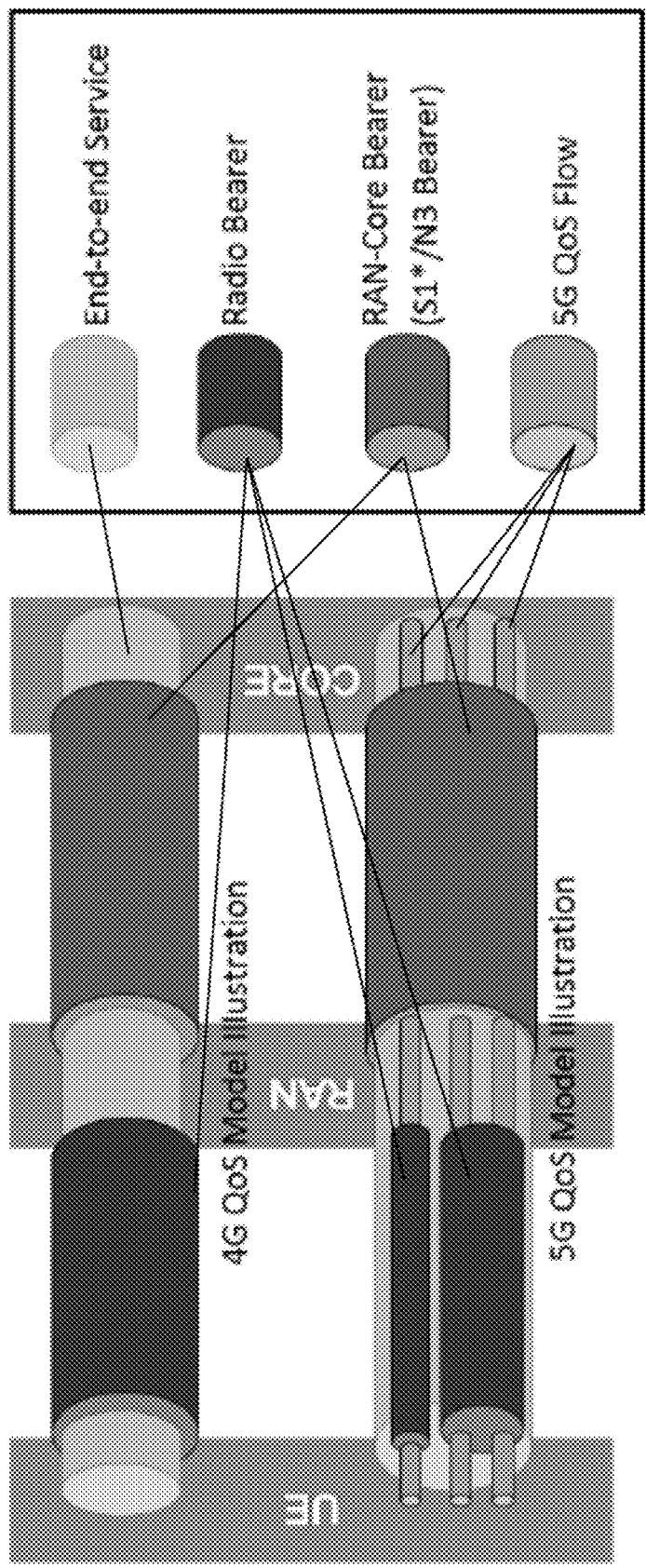
FIG. 3B depicts quality of service (QoS) and network slicing for a network based on a 5G implementation, according to example embodiments.
Figure 3C:
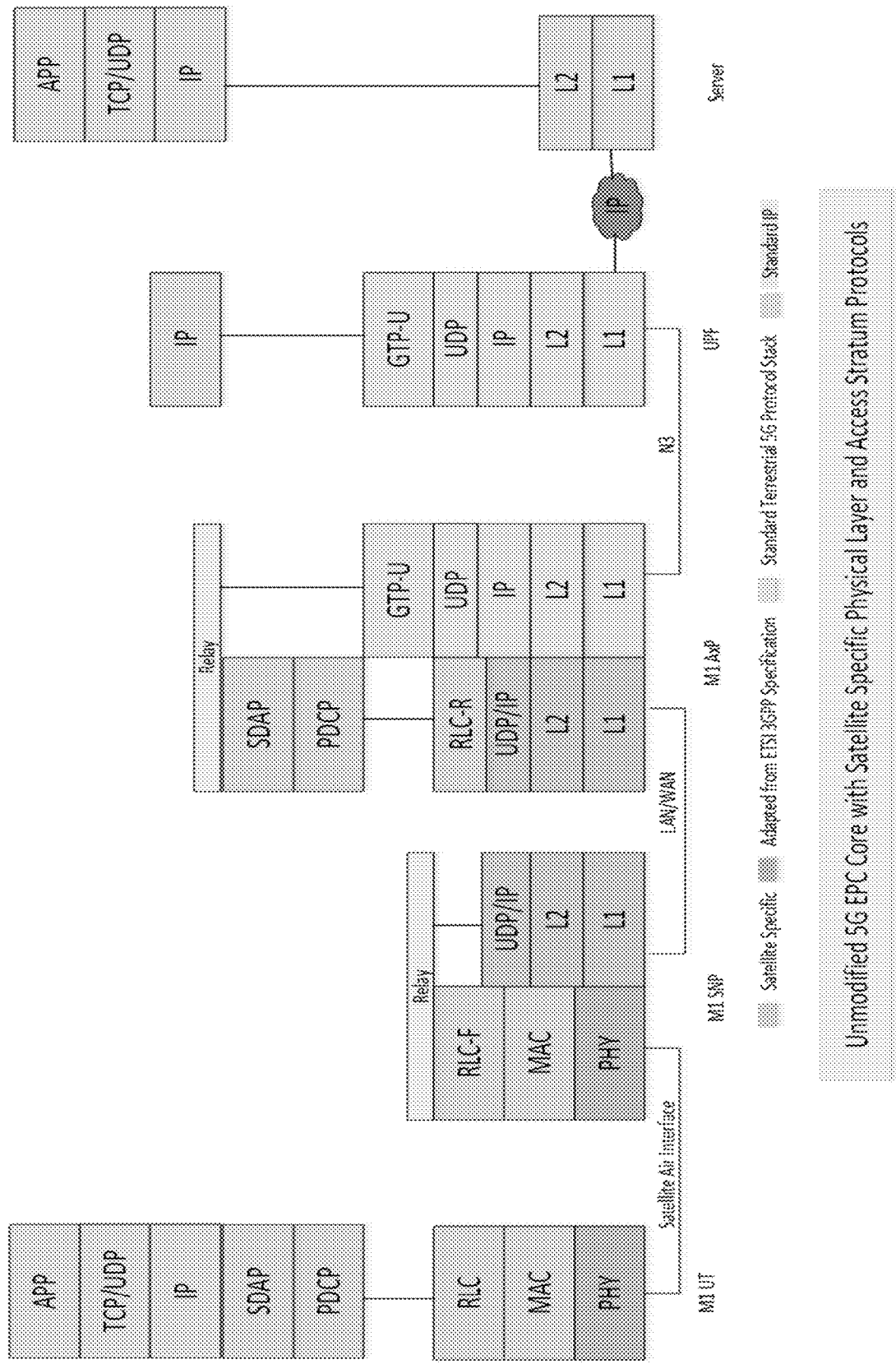
FIG. 3C depicts a user plane protocol architecture for a medium earth orbit (MEO) system, based on a 5G implementation, according to example embodiments.
Figure 3D:
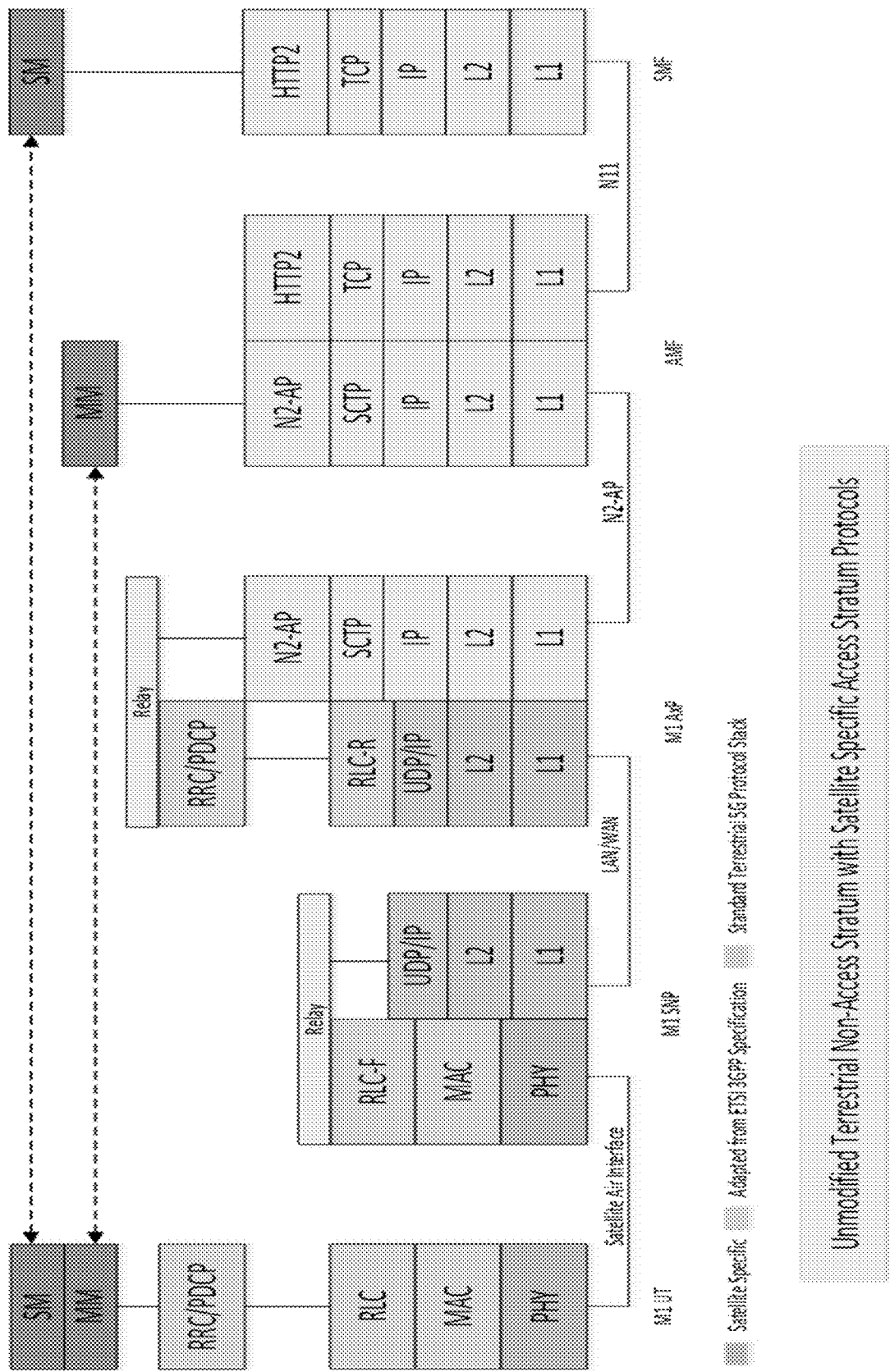
FIG. 3D depicts a user plane protocol architecture for a medium earth orbit (MEO) system, based on a 5G implementation, according to example embodiments.

FIG. 3A depicts a network architecture for a medium earth orbit (MEO) system, based on a 5G implementation, FIG. 3B depicts quality of service (QoS) and network slicing for a network based on a 5G implementation, FIG. 3C depicts a user plane protocol architecture for a medium earth orbit (MEO) system, based on a 5G implementation, and FIG. 3D depicts a user plane protocol architecture for a medium earth orbit (MEO) system, based on a 5G implementation, according to example embodiments.

With regard to the user terminal (UT), according to example embodiments, the UT may have respective elements for optimal beamforming performance (e.g., respective beamforming elements for Ku and Ka bands). This configuration provides for low latency throughput services via LEO satellites and latency tolerant high throughput services via MEO satellites. Such a configuration also provides for high throughput services via M1 satellites, for example, for an M1 only UT or when L1 services are unavailable (e.g., due to coverage gaps), and provides for high throughput L1 services when M1 services are unavailable.

Figure 4A:
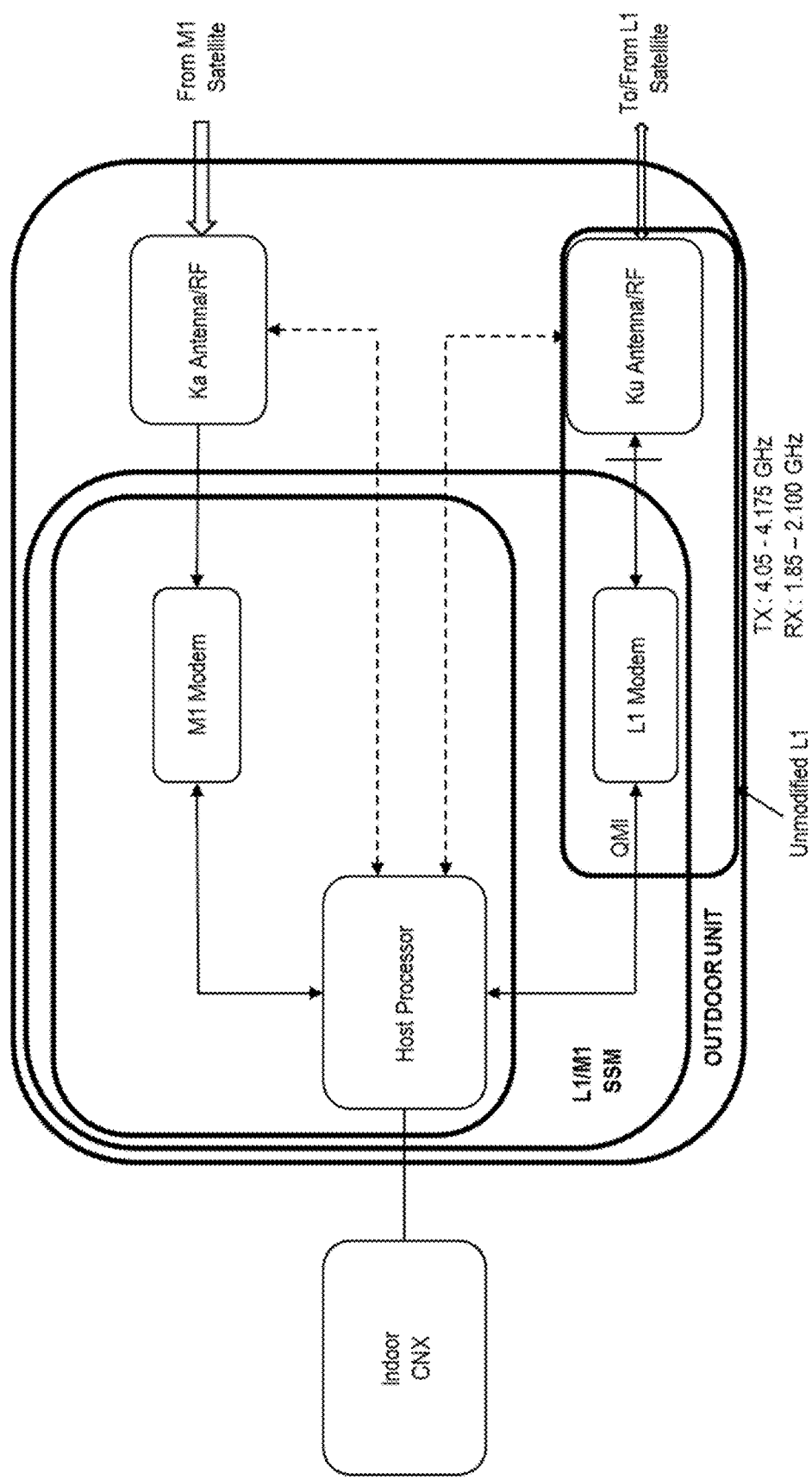
FIG. 4A depicts a user terminal (UT) architecture for an L1 uplink (via a LEO satellite) and M1 downlink (via a MEO satellite) configuration, according to example embodiments.
Figure 4B:
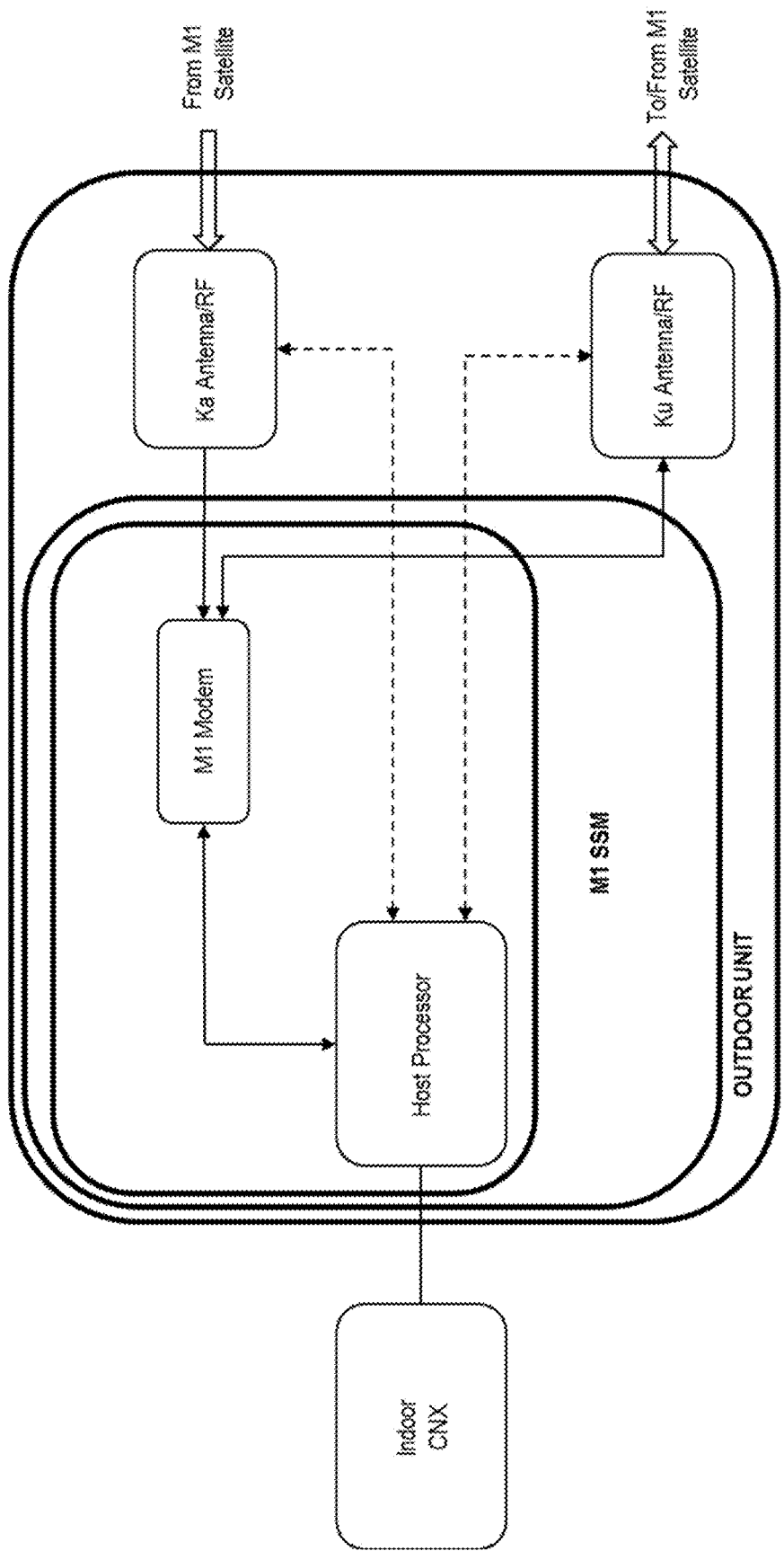
FIG. 4B depicts a user terminal (UT) architecture for an M1 uplink (via a MEO satellite) and M1 downlink (via a MEO satellite) configuration, according to example embodiments.

FIG. 4A depicts a user terminal (UT) architecture for an L1 uplink (via a LEO satellite) and M1 downlink (via a MEO satellite) configuration, and FIG. 4B depicts a user terminal (UT) architecture for an M1 uplink (via a MEO satellite) and M1 downlink (via a MEO satellite) configuration, according to example embodiments.

Figure 5:
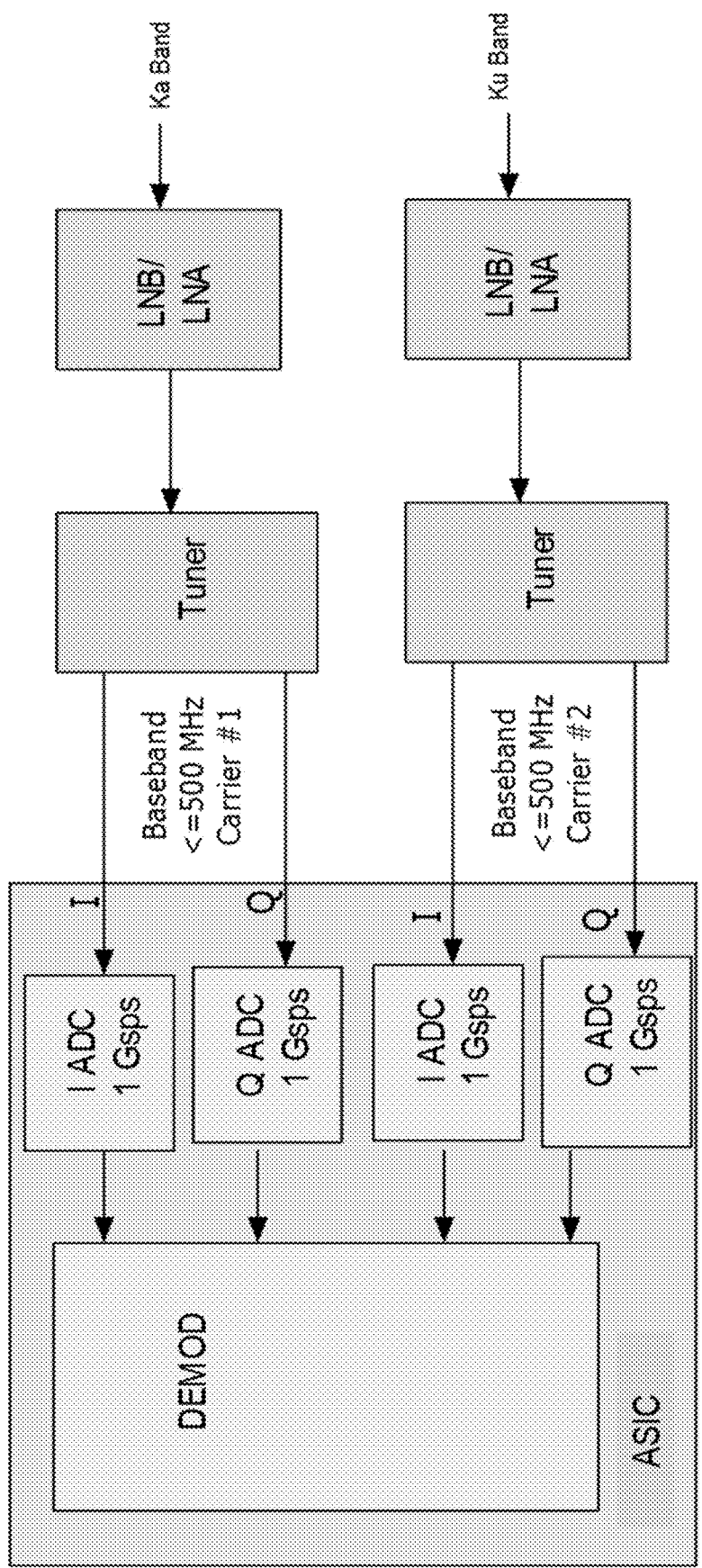
FIG. 5 depicts an example of band selection and carrier aggregation for a user terminal (UT), according to example embodiments.

FIG. 5 depicts an example of band selection and carrier aggregation for a user terminal (UT), according to example embodiments.

Figure 6:
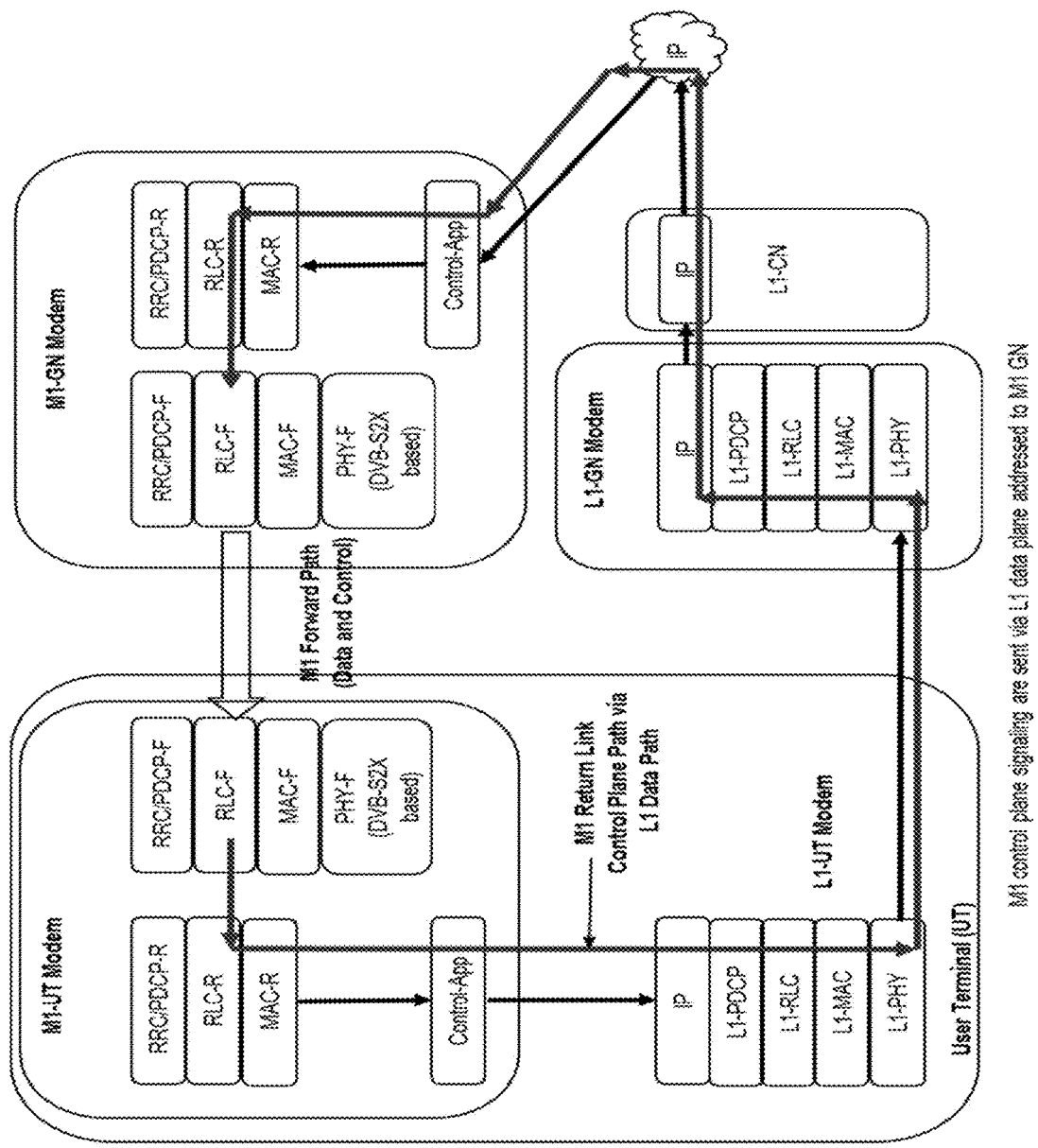
FIG. 6 depicts the protocol stack for an M1 forward path (gateway (GW) to UT) L1 and an L1 return path (UT to GW), according to example embodiments.

FIG. 6 depicts the protocol stack for an M1 forward link or path (gateway (GW) to UT) L1 and an L1 return link or path (UT to GW), according to example embodiments. As illustrated, return link data plane data transfers to external IP networks use an L1 data plane stack. For control plane signaling, however, the M1 modem needs connectivity to the M1 gateway node (GN) to provide L2 acknowledgements, measurement reports etc. Further, the Figure shows an example for radio link control (RLC) acknowledgements, and the same concept may apply for radio resource control (RRC), network access stratum (NAS), uplink data etc.

Figure 7:
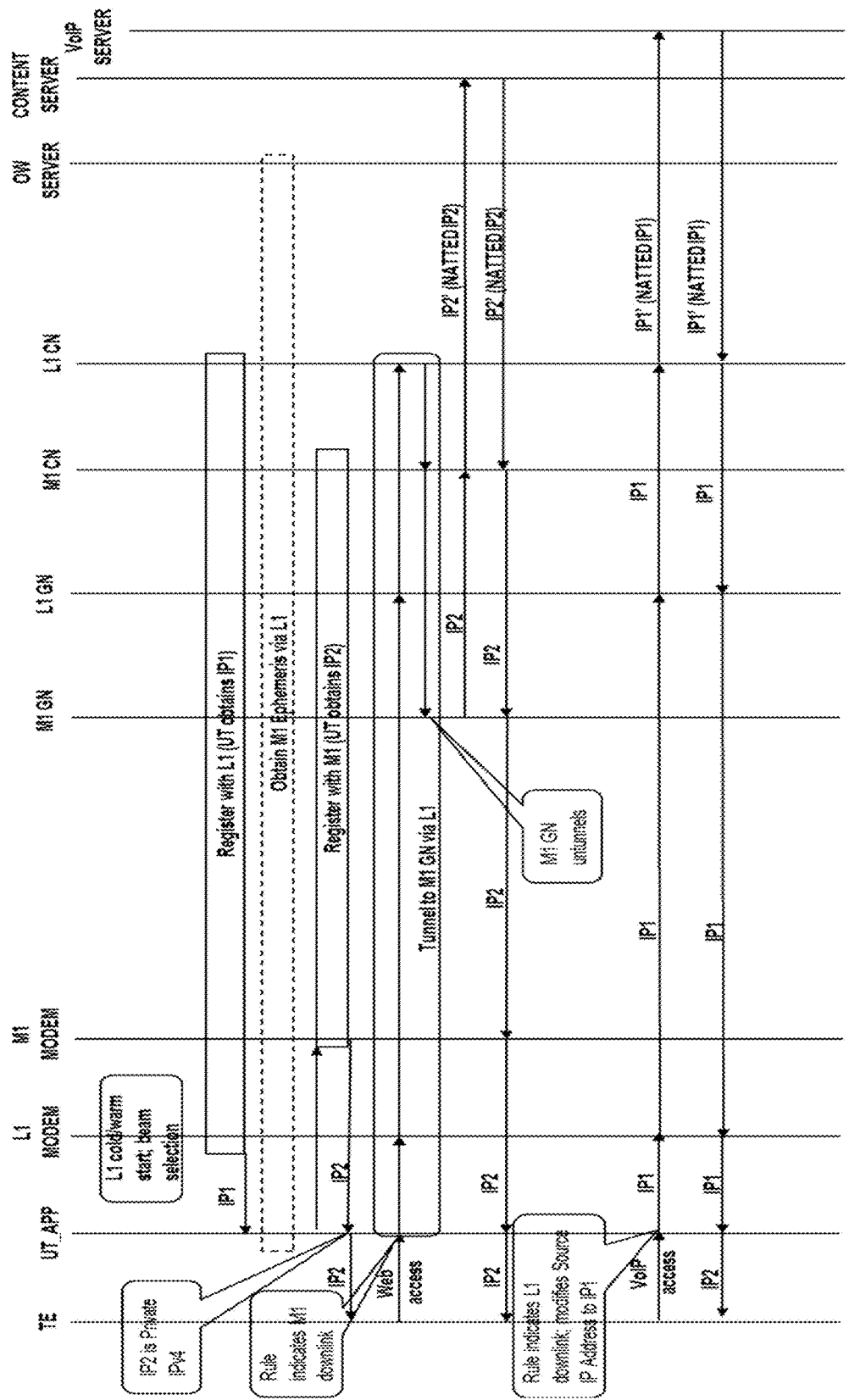
FIG. 7 illustrates signaling/routing for an L1 uplink and an M1 downlink, according to example embodiments.

FIG. 7 illustrates signaling/routing for an L1 uplink and an M1 downlink, according to example embodiments. By way of example, the host processor of the UT is configured to use an L1 uplink and L1 downlink for delay sensitive applications, such as voice over Internet Protocol (VoIP), and routing is via an L1 uplink and an M1 downlink for all other sessions.

Air Interface

According to example embodiments, features of the air interface may include (i) protocol architecture based on terrestrial 4G/5G, (ii) lower layers (e.g., PHY/MAC/RLC) optimized for satellite environment, (iii) physical layer (PHY) forward link based on DVB-S2x, (iv) carrier aggregation in the forward link, (v) delay and battery efficient media access control (MAC) design, (vi) dynamic link adaptation (e.g., power control and modulation and coding (MCS) adaptation), (vii) intra-system frequency, satellite, gateway and feeder link handovers, (viii) support for multiple terminal types, (ix) fixed, vehicular, aeronautical, maritime terminal applications, (x) full duplex and half duplex communications, (xi) support for bidirectional L1 and forward link M1 use case, (xii) fallback support to L1 when M1 coverage is unavailable, (xiii) performance enhancing proxies (PEP) for transmission control protocol (TCP) based sessions (when security permits), (xiv) resource efficient multicast/broadcast, (xv) rain diversity for gateways, (xvi) idle mode and cold/warm start based on Ka downlink, (xvii) differentiated quality of service (QoS), (xviii) over-the-air security—e.g., facilitating 256 bit AES security, (xix) header compression, (xx) uplink power control (ULPC) in forward gateway feeder link, (xxi) legal interception routing support, (xxii) IPv4 and IPv6 support across air interface, and (xxiii) congestion control support based on 3GPP Access Class barring concept.

Figure 8A:
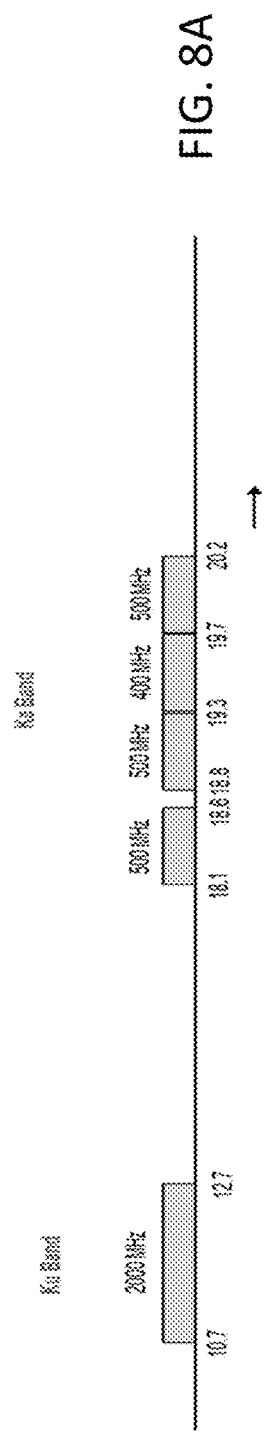
FIG. 8A illustrates a service link spectrum allocation for a forward link, according to example embodiments.
Figure 8B:
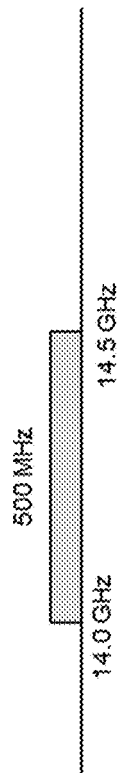
FIG. 8B illustrates a service link spectrum per beam per polarization for a return link, according to example embodiments.
Figure 8C:
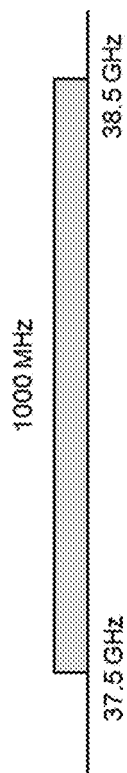
FIG. 8C illustrates a feeder link spectrum per beam per polarization for a return link, according to example embodiments.
Figure 8D:
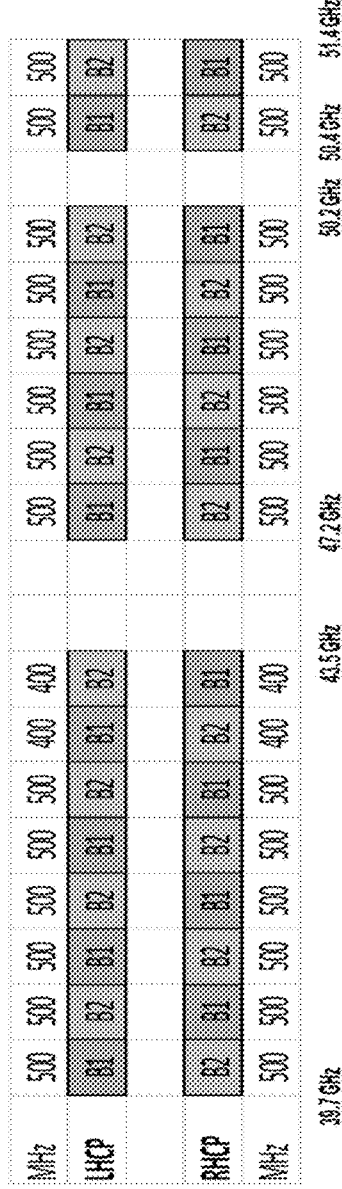
FIG. 8D illustrates an example mapping between a gateway (GW) feeder link and a user terminal (UT) service link (in the forward-link direction), based on the link spectrum of FIG. 8A, according to example embodiments.

Service Link Spectrum-Forward Link; Mapping Between Feeder Link and Service Link (Forward Link); Return Link Channelization:

FIG. 8A illustrates a service link spectrum allocation for a forward link, according to example embodiments. FIG. 8B illustrates a service link spectrum per beam per polarization for a return link, and FIG. 8C illustrates a feeder link spectrum per beam per polarization for a return link, according to example embodiments. FIG. 8D illustrates an example mapping between a gateway (GW) feeder link and a user terminal (UT) service link (in the forward-link direction), based on the link spectrum of FIG. 8A, according to example embodiments. In the example of FIG. 8A, there are two carrier bandwidths of 500 MHz and 400 MHz, which facilitates full utilization of the available spectrum and facilitates operation in areas where a particular 500 MHz band may not be permitted due to regulatory restrictions. Alternatively, 250 MHz operation may be employed, for example, if there are many areas where 250 MHz cannot be used and the use of 500 MHz channelization therefore eliminates 500 MHz instead of 250 MHz. Further, carrier aggregation (e.g., max two carriers) may be employed in the forward link to achieve higher throughputs per UT (e.g., two 500 MHz carriers or one 500 MHz and one 400 MHz carrier). Based on the service link spectrum allocation shown in FIG. 8A, each service link beam can have up to 3.9 GHz of spectrum per polarization, for example, configured as equivalently seven 500 MHz carriers and one 400 MHz carrier per polarization per beam, or fourteen 500 MHz carriers and two 400 MHz carriers using two polarizations per beam. According to the feeder link spectrum allocation of FIG. 8C, a total of 7.8 GHz per polarization permits fourteen 500 MHz carriers and two 400 MHz carriers per polarization, which is equivalent of one service link beam channelization. Using both polarizations, one Gateway can thereby accommodate two service link beams (e.g., which provides for four Gateways per 8 beam satellite). Then FIG. 8D shows an example mapping between feeder link spectrum and service link beams. The foregoing minimizes feeder link cross-pol interference effects on service link beams.

Further, according to one example embodiment, the return link channelization may be as follows. The service link spectrum per beam per polarization and the feeder link spectrum per gateway per polarization shown in FIGS. 8B and 8C, respectively, for example, can accommodate twenty four traffic carriers per beam per polarization (~20 MHz wide). A total of forty eight carriers using two polarizations per beam can thus be carried on the depicted feeder link spectrum of 1 GHz. Further, given two polarizations in a feeder link, a gateway can support two service link beams (which is consistent with the forward link example).

Figure 9A:
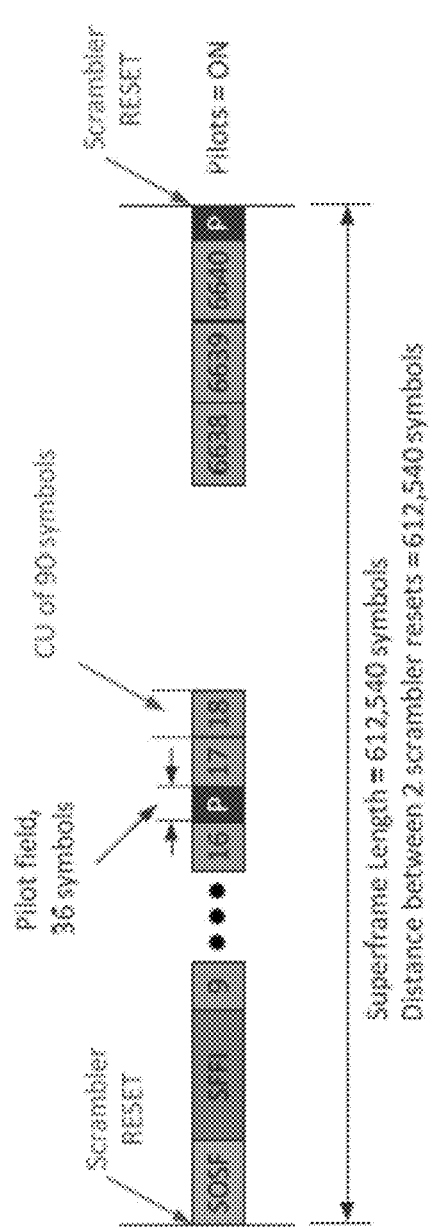
FIG. 9A shows an example for the physical layer framing for the forward link, based on the format 0 of Annex E (from the publication ETSI EN 302 307-2), using a different super_frame length, according to example embodiments.

Physical Layer (PHY):

According to further example embodiments, the physical layer (PHY) may be based on the DVB-S2x standard (which are published in the European Telecommunications Standards Institute (ETSI) specification ETSI EN 302 307-2, V1.1.1 (October 2014)). Further, the super-framing concept of Annex E of the ETSI EN 302 307-2 standard may be used for efficient operation with half-duplex terminals. By way of example, FIG. 9A shows an example for the physical layer framing for the forward link, based on the format 0 of Annex E (from the publication ETSI EN 302 307-2), using a different super_frame length. By way of further example, unlike the DVB-S2X specifications, where the presence or absence of super_frame aligned pilots are dynamically indicated at the previous frame, here it is assumed that pilots will always be used. This provides enough flexibility to design air interface for battery conservation designs. Very low signal to noise ratio (VL-SNR) frames may operate in presence of Ka rain fade, and possible use for equivalent power flux density (EPFD) and power conservation.

Figure 9B:
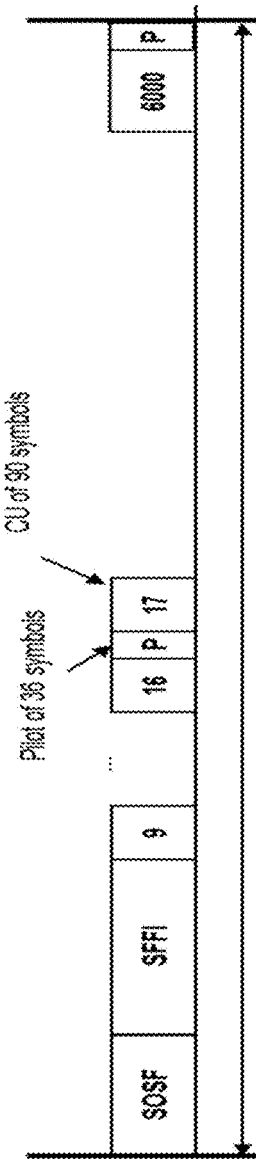
FIG. 9B shows an example of the super_frame length (based on the framing of FIG. 9A) for a super_frame length of 1.25 ms and 500 MHz operation.
Figure 9C:
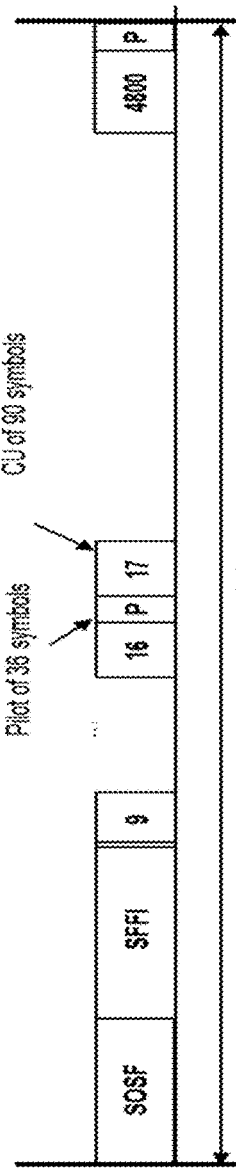
FIG. 9C shows an example of the super_frame length (based on the framing of FIG. 9A) for a super_frame length of 1.25 ms and 400 MHz operation.

Forward Link Super_Frame Length:

According to such example embodiments, based on the DVB-S2x, Annex E, format 0 structure of 36 symbol pilot for every 1440 symbols of user data, the super_frame length has 1476*N symbols (where N is an integer). The time duration of super_frame may have some integer relationship with system_frame that can be derived from 1 PPS signal, which permits features such as discontinuous reception (DRX), duty cycling etc., to be derived based on system_frame numbers. Super_frame lengths (in terms of number of symbols) should not be too short such that overhead due to super_frame headers becomes too high, and should not be too long such that acquisition of super_frames takes long time. By way of example, for 500 MHz operation, the super_frame length may be to be 1.25 ms in duration. Thus, for a 500 MHz channel with a symbol rate 442.8 Msps (roll off ~12%), this translates to 553,500 symbols per super_frame (as shown in FIG. 9B). By way of further example, the same super_frame length of 1.25 ms may be maintained for 400 MHz operation in a downlink. With this, the system timing budgets for half-duplex operation may be maintained the same from scheduler point of view regardless of 400 MHz or 500 MHz operation in downlink. For 400 MHz operation, with symbol rate of 354.24 Msps (roll off ~12%), this translates to a super_frame length of 442,800 symbols (as shown in FIG. 9C). With this approach, eight such super_frames constitute a 10 ms system_frame.

Framing and Synchronization:

FIG. 9D shows an example for forward link system framing based on a system_frame of 10 ms, according to example embodiments. According to such example embodiments, forward link framing may be based on DVB-S2X super_frames, whereby there are 8 DVB-S2X super_frames per 10 ms system_frame. The system_frame may be aligned with GPS, where the system_frame is defined at the satellite. The M1 gateway node may precompensate for delay and Doppler in the feeder link based on satellite ephemeris data. The M1 user terminal may accommodate for service link delay and Doppler based on satellite ephemeris (except on cold start). Forward link transmissions may be staggered to minimize peak current requirements at the satellite.

FIG. 9E shows an example for return link system framing based on a system_frame of 10 ms, according to example embodiments. The return link framing may be TDMA, for example, with a 0.25 ms slot length and 40 slots per 10 ms system_frame. The M1 gateway node may accommodate for delay and Doppler in the feeder link based on satellite ephemeris data. The M1 user terminal may precompensate for service link delay and Doppler based on satellite ephemeris data.

Forward Link Bearers:

According to example embodiments, forward link bearers may also be based on the DVB-S2X specifications, for example: (i) supported modulation schemes may include $\pi/2$ BPSK, QPSK, 8 PSK, 16 APSK, 32 APSK, 64 APSK and 256 APSK, (ii) links may be limited to 32 APSK or below, (iii) LDPC Coding schemes may be from Rate 1/5 with spreading to Rate 9/10, (iv) Es/No ranges may be from −9.9 dB to 19.1 dB, (v) adaptive coding and modulation (ACM) may be employed to maximize throughput, (vi) PHY throughput greater than 1 Gbps may be supported, and (vii) higher layer throughput may depend on software processor choice, such as 200-300 Mbps with internal software processor, or Higher speeds with external software processors.

Return Link Bearers:

According to example embodiments, return link bearers may be based on low density parity check code (LDPC) designs, for example: (i) supported modulation schemes may include $\pi/2$ BPSK, $\pi/4$ QPSK, 8 PSK and 16 APSK, (ii) LDPC Coding schemes may be from Rate 1/5 to Rate 9/10 with spreading, (iii) Es/No ranges may be from −8 dB to 14 dB, (iv) power control may be employed to maintain desired transmit EIRP density, received flux density, (v) adaptive coding and modulation (ACM) may be employed to maximize throughput, and (vi) throughput may be up to 50 Mbps over 20 MHz (subject to link closure).

M1 Idle Mode and Tracking Area Definitions:

According to example embodiments, M1 idle mode may be based on Ka downlink signals from an M1 satellite when a UT is camped on L1 for Ku operation. In this case, the UT may have two idle modes, one for L1 and one for M1. The UT may register separately with the network via both M1 and L1 systems (e.g., two separate IP addresses for M1 and L1). Existing cold start over L1 and warm start for M1 may be based on M1 ephemeris over L1 link. Further, M1 idle mode may be based on Ku or Ka downlink signals from an M1 satellite when a UT is not camped on L1 for Ku operation. Cold start for M1 may be needed when ephemeris not available. Further, M1 system is designed independently of L1 system, and thus tracking area definitions for the M1 system can be different from the tracking area definitions for L1, even though L1 and M1 coverage may overlap geographically.

Carrier Aggregation in Forward Link:

According to example embodiments, the system may support aggregation of two forward link carriers (e.g., one on Ku and one on Ka) to improve forward link throughput. The two carriers need not be of same symbol rate. Data aggregation may be performed at layer 2. Independent MCS adaptation may be performed on the two links. Control signaling in the return link may distinguish link quality reporting for component carriers. The second carrier may be added or removed by signaling, where adding may be done sufficiently in advance taking into account retuning and acquisition time.

Figure 10A:
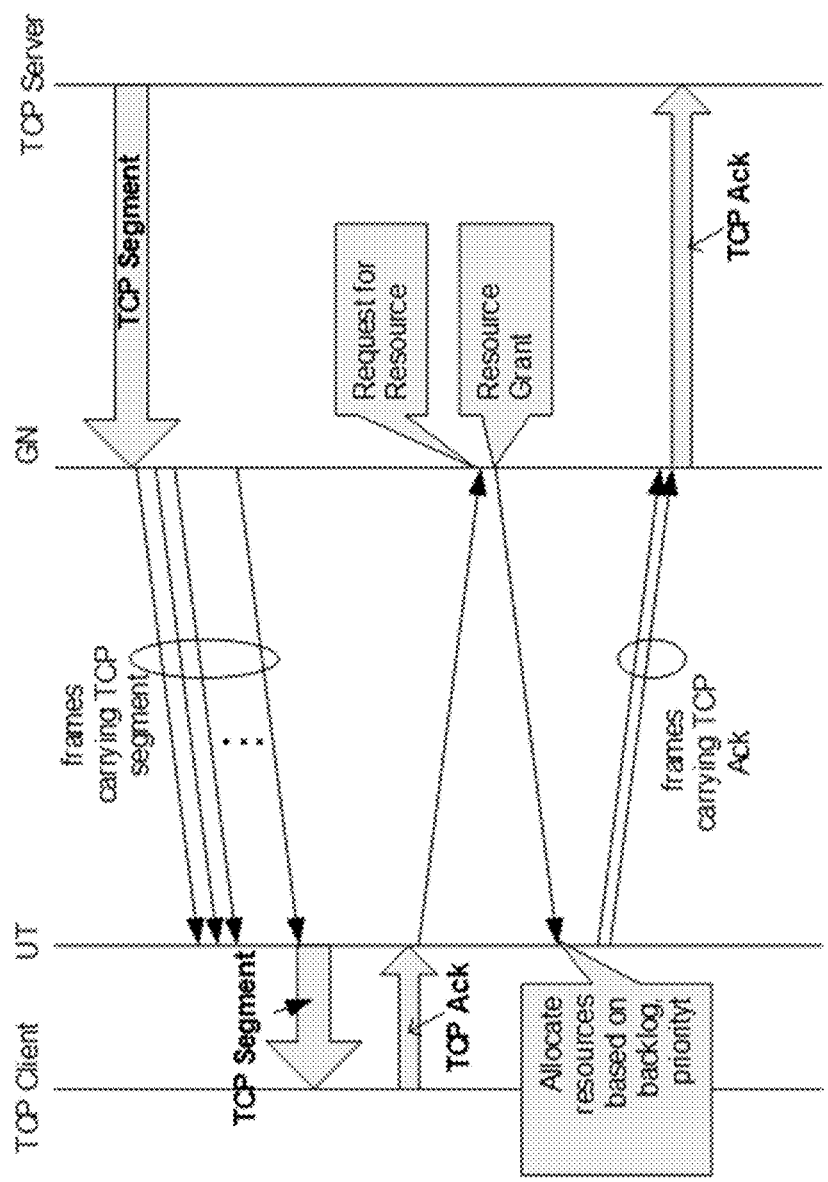
FIG. 10A illustrates signaling for media access control (MAC) resource allocation to a user terminal, without utilizing unsolicited uplink grants, according to example embodiments.
Figure 10B:
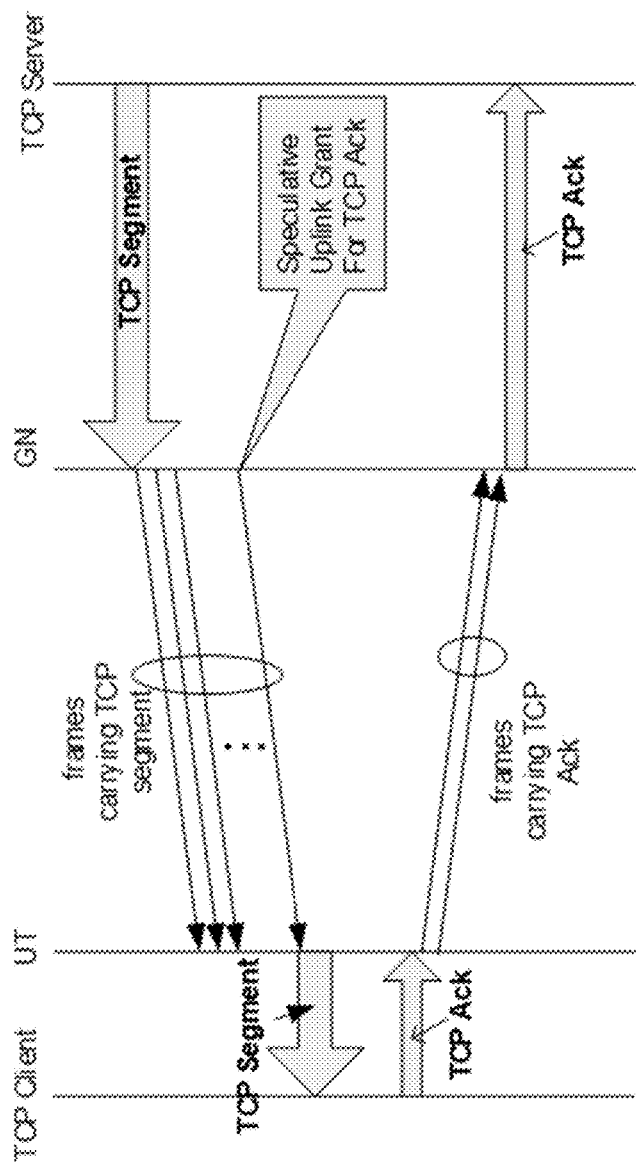
FIG. 10B illustrates signaling for media access control (MAC) resource allocation to a user terminal, utilizing unsolicited uplink grants, according to example embodiments.
Figure 12:
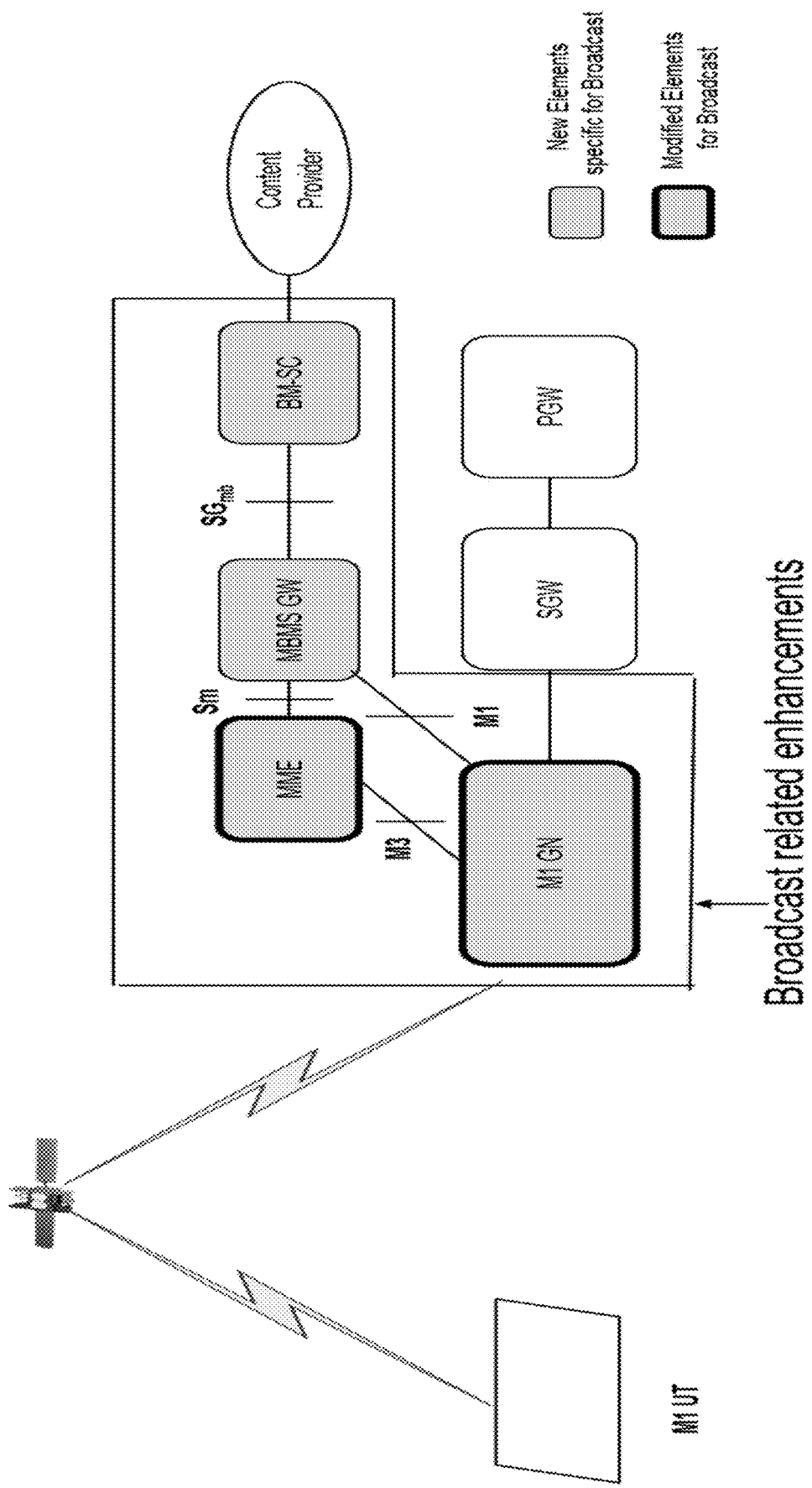
FIG. 12 depicts a network architecture for broadcasting using a Multimedia Broadcast Multicast Service (MBMS) approach, according to example embodiments.

Enhanced MAC with Unsolicited Uplink Grants (UUG):

FIG. 10A illustrates signaling for media access control (MAC) resource allocation to a user terminal, without utilizing unsolicited uplink grants, and FIG. 10B illustrates signaling for media access control (MAC) resource allocation to a user terminal, utilizing unsolicited uplink grants, according to example embodiments. According to example embodiments, the media access control (MAC) may employ unsolicited uplink resource grants to a UT, whereby uplink resources are allocated to a terminal without receiving any uplink allocation request from the terminal. This approach improves transmission control protocol (TCP) throughput, reduces load on contention channels, and works even with secure TCP connections.

Downlink Scheduling:

According to example embodiments, downlink scheduling may be based on terminal capability and battery status. Half duplex scheduling may be such that it does not overlap with a previously allocated uplink transmission. The presence of user data in downlink may be indicated via a downlink map transmitted in every super_frame. Downlink for battery operated terminals may be scheduled in forward link closer to the super_frame header. Downlink scheduling may be performed in semi-persistent way with known periodicity when battery status from UT indicates that it is below a threshold, and the UT only needs to wake up on those super_frames to obtain its downlink data and check for uplink grants. System information in downlink may be organized such that super_frames within system_frames can be turned off periodically to conserve satellite power. Super_frame boundaries may be staggered across carriers and beams to minimize peak current usage in the satellite.

FIGS. 11A and 11B illustrate different user terminal (UT) batter efficient scheduling scenarios, according to example embodiments Return Link Load Reduction:

According to example embodiments, the return link may be configured to reduce load. Video streaming services may use TCP for reliable delivery of encoded video streams (e.g., Dynamic Adaptive Streaming over HTTP (DASH) is one scheme used by providers such as Netflix which use TCP). Typically, with TCP, a TCP acknowledgement is transmitted for every two TCP segments that the receiver receives. Assuming IPv4, this translates to approximately 40 bytes for every 3000 bytes received by a UT, which translates to approximately 1.33% of downlink throughput. Uplink is also used for control signaling and HTTP GETs. Further, modern Internet usage is such that there are a number of parallel TCP connections with web servers in addition to the session of interest. Further, frequency allocation in the return link may be about 13% of downlink (500 MHz versus 3.9 GHz). With spectral efficiency in the downlink that is twice that of uplink, uplink throughput is about 6.5% of downlink throughput in a beam. Also, TCP Acknowledgements consume a significant portion of uplink resources. Accordingly, strategies may be employed to reduce TCP Ack load in the return link. Mitigation steps may include header compression in uplink, TCP Ack reduction techniques and TCP Ack generation at gateway node based on radio link control (RLC) acknowledgements.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A satellite communications system comprising:
   one or more low earth orbit (LEO) satellites;
   one or more medium earth orbit (MEO) satellites;
   a MEO gateway node (M1 GN) and a LEO gateway node (L1 GN);
   a user terminal (UT) including a MEO UT modem and a LEO UT modem; and
   a MEO core network (M1 CN) and a LEO core network (L1 CN); and
   wherein the L1 CN is configured to register the UT with a first IP address (IP1), and the M1 CN is configured to register the UT with a second IP address (IP2),
   wherein the MEO UT modem is configured to forward one or more control messages regarding the data communications received from the MEO GN, via a control message tunnel, to the MEO GN,
   wherein, via the control message tunnel, (i) the MEO UT modem is configured to provide the one or more control messages to the UT LEO modem, (ii) the LEO UT modem is configured to transmit the one or more control messages to the LEO GN via one or more of the LEO satellites, and (iii) the LEO GN is configured to provide the one or more control messages to the MEO GN,
   wherein, for a web access, a UT application includes a rule indicating an M1 downlink,
   wherein, via a tunnel to the M1 GN via the L1 CN, the UT App is configured to send the web access to the L1 GN via the LEO UT modem, the L1 GN is configured to send the web access to the L1 CN, the L1 CN is configured to send the web access to the M1 CN, and the M1 CN is configured to send the web access to the M1 GN,
   wherein the M1 GN is configured to untunnel the web access, and to forward the web access to a respective content server via the M1 CN using the IP2 address, wherein, for a voice over IP (VoIP) access, the UT application includes a rule indicating an L1 downlink, and the UT App is configured to send the VoIP access to the L1 GN via the LEO UT modem, the L1 GN is configured to send the VoIP access to the L1 CN using the IP1 address, and the L1 CN is configured to send the VoIP access to a respective VoIP server.

2. A method for data communications via one or more low earth orbit (LEO) satellites and one or more medium earth orbit (MEO) satellites, the method comprising:

registering, by a LEO core network (L1 CN), a user terminal (UT) with a first IP address (IP1);

registering, by a MEO core network (M1 CN), the UT with a second IP address (IP2);

forwarding, by a MEO modem of the UT (MEO UT Modem), one or more control messages regarding the data communications received from the MEO GN, via a control message tunnel, to the MEO GN, wherein, via the control message tunnel, (i) the one or more control messages are provided, by the MEO UT Modem, to a LEO modem of the UT (LEO UT Modem), (ii) the one or more control messages are transmitted, by the LEO UT Modem, to the LEO GN via one or more of the LEO satellites, and (iii) the one or more control messages are provided, by the LEO GN, to the MEO GN, via a tunnel to a MEO gateway node (M1 GN) via the L1 CN, sending (by a UT App) a web access to a LEO gateway node (L1 GN) via the LEO UT modem, sending (by the L1 GN) the web access to the L1 CN, sending (by the L1 CN) the web access to the M1 CN, and sending (by the M1 CN) the web access to the M1 GN, wherein the UT application includes a rule indicating an M1 downlink;

untunneling (by the M1 GN) the web access, and forwarding the untunneled web access to a respective content server via the M1 CN using the IP2 address, sending (by the UT App) a VoIP access to the L1 GN via the LEO UT modem, sending (by the L1 GN) the VoIP access to the L1 CN using the IP1 address, and sending (by the L1 CN) the VoIP access to a respective VoIP server, wherein the UT application includes a rule indicating an L1 downlink.

* * * * *